US012166719B2

United States Patent
Mozaffari et al.

(10) Patent No.: US 12,166,719 B2
(45) Date of Patent: Dec. 10, 2024

(54) USER EQUIPMENT, NETWORK NODE AND METHODS IN A WIRELESS COMMUNICATIONS NETWORK

(71) Applicant: Telefonaktiebolaget LM Ericsson (publ), Stockholm (SE)

(72) Inventors: Mohammad Mozaffari, Fremont, CA (US); Yi-Pin Eric Wang, Fremont, CA (US); Kittipong Kittichokechai, Järfälla (SE); Mehrnaz Afshang, Fremont, CA (US); Yutao Sui, Solna (SE); Zhilan Xiong, Solna (SE); Saeedeh Moloudi, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 400 days.

(21) Appl. No.: 17/747,633

(22) Filed: May 18, 2022

(65) Prior Publication Data

US 2023/0379123 A1    Nov. 23, 2023

(51) Int. Cl.
*H04W 4/00* (2018.01)
*H04L 5/00* (2006.01)

(52) U.S. Cl.
CPC .................. *H04L 5/0053* (2013.01)

(58) Field of Classification Search
CPC ......... H04L 5/0053; H04L 5/00; H04L 72/23; H04L 72/51
USPC ....................................................... 370/329
See application file for complete search history.

(56) References Cited

U.S. PATENT DOCUMENTS

| | | | |
|---|---|---|---|
| 10,111,224 B2* | 10/2018 | Lee | H04W 74/0833 |
| 11,108,529 B2* | 8/2021 | Su | H04W 48/12 |
| 11,626,894 B2* | 4/2023 | Landis | H04B 1/0475 |
| | | | 375/262 |
| 12,058,700 B2* | 8/2024 | Park | H04B 7/0626 |

(Continued)

FOREIGN PATENT DOCUMENTS

| | | |
|---|---|---|
| WO | 2020194240 A1 | 10/2020 |
| WO | 2021067703 A1 | 4/2021 |

(Continued)

OTHER PUBLICATIONS

International Search Report and Written Opinion dated Apr. 28, 2023 for International Application No. PCT/SE2023/050335 filed Apr. 12, 2023, consisting of 18-pages.

(Continued)

*Primary Examiner* — Marceau Milord
(74) *Attorney, Agent, or Firm* — Weisberg I.P. Law, P.A.

(57) ABSTRACT

A method performed by a User Equipment (UE) for handling a Control Resource Set (CORESET) from a network node in a wireless communications network is provided. The UE operates with a reduced bandwidth. The UE detects a CORESET from the network node, and that a bandwidth of the CORESET is larger than the bandwidth of the UE. Physical Downlink Control Channel (PDCCH) candidates are transmitted in the CORESET. The UE determines which part of the CORESET to skip, to make the bandwidth of the CORESET equal or smaller than the bandwidth of the UE, such that the UE is capable of receiving the CORESET. The part of the CORESET to be skipped is determined based on a predicted decoding performance of the PDCCH candidates in the CORESET.

30 Claims, 19 Drawing Sheets

(56) References Cited

U.S. PATENT DOCUMENTS

| | | | |
|---|---|---|---|
| 2014/0078998 A1 | 3/2014 | Hsieh et al. | |
| 2018/0167946 A1* | 6/2018 | Si | H04L 5/00 |
| 2019/0069297 A1* | 2/2019 | Lee | H04W 74/0833 |
| 2021/0084637 A1* | 3/2021 | Cheng | H04W 72/51 |
| 2021/0112557 A1* | 4/2021 | Lee | H04L 1/0026 |
| 2021/0250930 A1 | 8/2021 | Sakhnini et al. | |
| 2021/0329681 A1* | 10/2021 | Sakhnini | H04W 72/23 |
| 2021/0329691 A1* | 10/2021 | Sun | H04W 74/0833 |
| 2021/0410086 A1* | 12/2021 | Davydov | H04L 27/2613 |
| 2022/0014397 A1* | 1/2022 | Taherzadeh Boroujeni | H04L 25/0238 |
| 2022/0109532 A1* | 4/2022 | Talarico | H04L 5/0053 |
| 2022/0116859 A1* | 4/2022 | Park | H04L 5/0094 |
| 2022/0116967 A1* | 4/2022 | Yeo | H04W 72/1268 |
| 2022/0225362 A1* | 7/2022 | Yi | H04W 72/046 |
| 2022/0304060 A1* | 9/2022 | Sakhnini | H04L 5/0053 |
| 2023/0156719 A1* | 5/2023 | Mozaffari | H04W 72/1263 370/329 |
| 2023/0292335 A1* | 9/2023 | Park | H04B 7/0404 |
| 2023/0299924 A1* | 9/2023 | Mozaffari | H04L 5/0053 370/329 |
| 2023/0379757 A1* | 11/2023 | Mozaffari | H04W 56/001 |
| 2024/0267931 A1* | 8/2024 | Zhou | H04L 5/001 |

FOREIGN PATENT DOCUMENTS

| | | | |
|---|---|---|---|
| WO | 2021151382 A1 | 8/2021 | |
| WO | 2021201757 A1 | 10/2021 | |
| WO | 2021206624 A1 | 10/2021 | |

OTHER PUBLICATIONS

3GPP TSG-RAN WG1 Meeting #103-e R1-2008837; Title: Potential UE complexity reduction features for RedCap; Agenda Item: 8.6.1; Source: Ericsson; Document for: Discussion and Decision; Date and Location: Oct. 26-Nov. 13, 2020, Online, consisting of 62-pages.

3GPP TSG RAN WG1 #111 R1-2212888; Title: Summary of discussion on enhancements to operate NR on dedicated spectrum less than 5MHz; Agenda Item: 9.16.1; Source: Moderator (Lenovo); Document for: Discussion and Decision; Date and Location: Nov. 14-18, 2022, Toulouse, France, consisting of 38-pages.

3GPP TS 38.213 V16.1.0; 3rd Generation Partnership Project; Technical Specification Group Radio Access Network; NR; Physical layer procedures for control (Release 16); Mar. 2020, consisting of 156 pages.

3GPP TS 38.331 V15.8.0; 3rd Generation Partnership Project; Technical Specification Group Radio Access Network; NR; Radio Resource Control (RRC) protocol specification (Release 15); Dec. 2019, consisting of 532 pages.

3GPP TS 38.101-2 V16.3.1; 3rd Generation Partnership Project; Technical Specification Group Radio Access Network NR; User Equipment (UE) radio transmission and reception; Part 2: Range 2 Standalone (Release 16); Mar. 2020, consisting of 170 pages.

3GPP TSG RAN WG1 Meeting #106bis-e R1-2110385; Title: RAN1 agreements for Rel-17 NR RedCap; Agenda Item: 8.6; Source: Rapporteur (Ericsson); Document for: Information; Location and Dated: e-Meeting, Oct. 11-19, 2021, consisting of 18 pages.

3GPP TSG RAN Meeting #92e RP-211574; Title: Revised WID on support of reduced capability NR devices; Source: Ericsson; Document for: Approval; Agenda Item: 9.7.1.7; Location and Date: Electronic Meeting, Jun. 14-18, 2021; Revision of RP-210918, consisting of 6 pages.

3GPP TR 38.875 V1.0.0; 3rd Generation Partnership Project; Technical Specification Group Radio Access Network; Study on support of reduced capability NR device (Release 17); Dec. 2020, consisting of 112 pages.

3GPP TS 38.211 V15.8.0; 3rd Generation Partnership Project; Technical Specification Group Radio Access Network; NR; Physical channels and modulation (Release 15); Dec. 2019, consisting of 97 pages.

* cited by examiner

401. Detect a CORESET from a network node, and that a bandwidth of the CORESET is larger than the bandwidth of the UE.

402. Determine which part of the CORESET to skip, to make the bandwidth of the CORESET equal or smaller than the bandwidth of the UE, such that the UE is capable to receive the CORESET.

403. Sending to the network node, a message indicating the part or parts of the CORESET that are determined to be skipped in order to make the bandwidth of the CORESET equal or smaller than the bandwidth of the UE, such that the UE (120) is capable to receive the CORESET.

404. Change the skipped part or parts of the subsequent CORESET within a time interval, so that the skipped part or parts of the CORESET in some or all of the subframes are non-overlapping or partially overlapping.

405. Receive the CORESET in which the determined part or parts are skipped.

FIG. 4

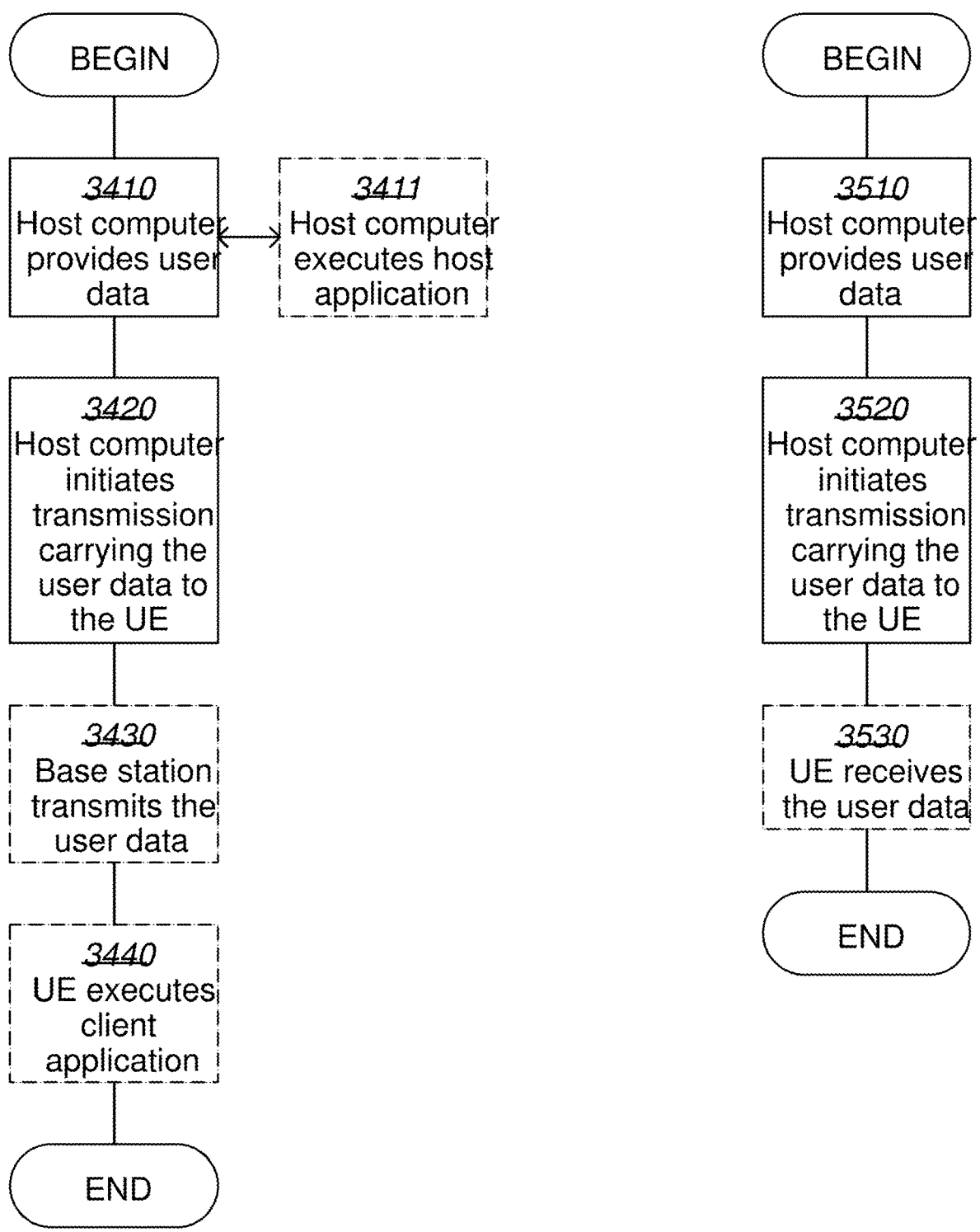

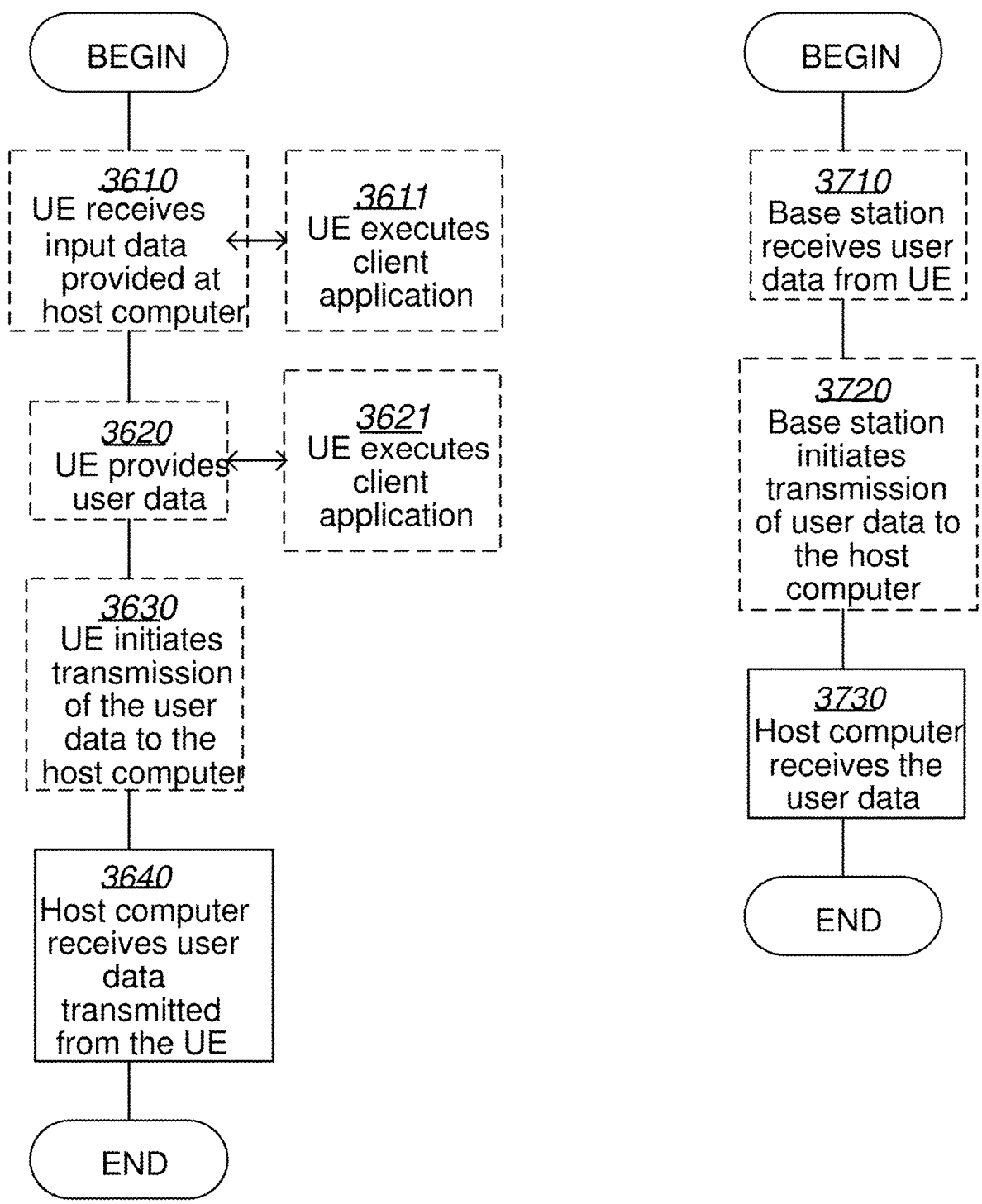

USER EQUIPMENT, NETWORK NODE AND METHODS IN A WIRELESS COMMUNICATIONS NETWORK

TECHNICAL FIELD

Embodiments herein relate to a User Equipment (UE), a network node and methods therein. In some aspects, they relate to handling a Control Resource Set (CORESET) from a network node in a wireless communications network.

BACKGROUND

In a typical wireless communication network, wireless devices, also known as wireless communication devices, mobile stations, stations (STA) and/or User Equipment (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands for 5G NR are being separated into two different frequency ranges, Frequency Range 1 (FR1) and Frequency Range 2 (FR2). FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHz. Bands in this millimeter wave range have shorter range but higher available bandwidth than bands in the FR1.

Multi-antenna techniques may significantly increase the data rates and reliability of a wireless communication system. For a wireless connection between a single user, such as UE, and a base station, the performance is in particular improved if both the transmitter and the receiver are equipped with multiple antennas, which results in a Multiple-Input Multiple-Output (MIMO) communication channel. This may be referred to as Single-User (SU)-MIMO. In the scenario where MIMO techniques is used for the wireless connection between multiple users and the base station, MIMO enables the users to communicate with the base station simultaneously using the same time-frequency resources by spatially separating the users, which increases further the cell capacity. This may be referred to as Multi-User (MU)-MIMO. Note that MU-MIMO may benefit when each UE only has one antenna. Such systems and/or related techniques are commonly referred to as MIMO.

Internet of Things (IoT) and Reduced Capability NR Devices

A next paradigm shift in processing and manufacturing is the Industry 4.0 in which factories are automated and made much more flexible and dynamic with the help of wireless connectivity. This includes real-time control of robots and machines using time-critical Machine-Type Communication (cMTC) and improved observability, control, and error detection with the help of large numbers of more simple actuators and sensors e.g., Massive Machine-Type Communication (mMTC). For cMTC support, URLLC was introduced in 3GPP Release 15 for both LTE and NR, and NR URLLC is further enhanced in Release 16 within the enhanced Ultra Reliable Low Latency Communications (eURLLC) and Industrial IoT work items.

For mMTC and Low Power Wide Area (LPWA) support, 3GPP introduced both Narrowband Internet-of-Things (NB-IoT) and Long-Term Evolution for Machine-Type Communication (LTE-MTC, or LTE-M) in Release 13. These technologies have been further enhanced through all releases up until and including the ongoing Release 16 work.

NR was introduced in 3GPP Release 15 and focused mainly on enhanced Mobile Broadband (eMBB) and cMTC. However, there are still several other use cases whose requirements are higher than those of LPWA networks, i.e., LTE-M/NB-IoT, but lower than those of URLLC and eMBB. In order to efficiently support such use cases which are in-between eMBB, URLLC, and mMTC, 3GPP has studied Reduced Capability NR devices (RedCap) in Release 7. The RedCap study item was completed in March 2021. A corresponding RedCap work item was started in December 2020 and is expected to be finalized in September 2022.

The RedCap UEs are required to have lower cost, lower complexity, a longer battery life, and potentially a smaller form factor than legacy NR UEs. Therefore, several different complexity reduction features will be specified for RedCap UEs in Release17. These complexity reduction features are listed in the Release 17 work item description (WID) for RedCap. In particular, the reduced maximum UE bandwidth for Release 17 RedCap are as follows:

Reduced maximum UE bandwidth for Release 17 RedCap:
  Maximum bandwidth of an FR1 RedCap UE during and after initial access is 20 MHz.
  Maximum bandwidth of an FR2 RedCap UE during and after initial access is 100 MHz.

Moreover, in Release 18 enhanced RedCap (eRedCap) there will be a study on further UE bandwidth reduction.

Release 18 eRedCap

Many industrial sensors use cases require a deployment of a massive number of sensors. Replacing the battery of each of these sensors might be prohibitively difficult or undesirable. In certain use cases, it might be difficult to access or even exactly locate the sensors after they have been deployed. Thus, for these use cases, a key enabler is to allow the sensors to sustain decades of operation without ever needing battery replacement. Furthermore, many of the sensor use cases operate in environments where it is possible to harvest ambient energy for operation. The harvested ambient energy may be, for example, vibrational energy, photovoltaic energy, thermal-electric generated energy.

Some of these considerations are also applicable to video surveillance and medical wearable use cases. For example, a video surveillance camera deployed outdoors may harvest solar energy. A medical wearable device may be able to harvest energy through vibration and it may be desirable that the patients do not need to replace battery themselves (i.e., battery lasts between office visits).

To further expand the market for RedCap use cases with relatively low cost, low energy consumption, and low data rate requirements, e.g., industrial wireless sensor network use cases, some further cost and complexity reduction enhancements can be considered. The enhancements can aim at supporting lower UE peak data rate and energy consumption compared to Release 17, while ensuring Release 17 compatibility.

To further expand the RedCap use cases, the following enhancements may be considered:

UE cost/complexity reduction: Further UE complexity/cost reduction without fundamental changes to the Release 17 basic RedCap UE type may be motivated to enable the uptake of RedCap UE in low-end use cases.

Study further reduced UE bandwidth: There exist different solutions to support use cases requiring low cost and low peak data rates. approach is based on further reducing maximum supported UE bandwidth, e.g., to 5MHz in FR1. There are trade-offs between expected cost/complexity reduction, specification impacts, and network impacts especially the compatibility with Release 17 and coexistence of RedCap and non-RedCap UEs. It is not clear if the additional cost saving gain is justified.

For support of UEs with different capabilities, e.g., bandwidth, in a network, it is important to ensure an efficient coexistence of different UEs while considering resource utilization, network spectral/energy efficiency, and scheduling complexity.

Initial Access

A first step in an initial access is that a UE detects DL synchronization reference signals, including Primary Synchronization Signal (PSS) and Secondary Synchronization Signal (SSS). Following that the UE reads a Physical Broadcast Channel (PBCH) which includes a Master Information Block (MIB). Among other information, MIB comprises Physical Downlink Control Channel (PDCCH)-Configured System Information Block 1 (SIB1, PDCCH-ConfigSIB1) which is the configuration of CORESET #0. After decoding CORESET0 which is the DL assignment for the remaining system information, the UE can receive the SIB1, which includes the Random Access Channel (RACH) configuration.

Random access is the procedure of UE accessing a cell, receiving a unique identification by the cell and receiving the basic radio resource configurations. The steps of four-step random access are as follows:

the UE transmits a preamble referred to as Physical Random Access Channel (PRACH)

the Network sends random access response (RAR), indicating reception of preamble and provides time-alignment command, the UE sends a PUSCH, a.k.a., Message 3, aiming at resolving collision The Network sends the contention resolution message, a.k.a., Message 4

The UE sends the ACK/NACK for Msg4 on the Physical Uplink Control Channel (PUCCH).

NR PDCCH and CORESET

Physical Downlink Control Channel (PDCCH) carries Downlink Control Information (DCI). PDCCHs are transmitted in Control Resource Sets (CORESETs) which span over one, two, or three contiguous OFDM symbols over multiple Resource Blocks (RBs). In frequency domain, a CORESET may span over one or multiple chunks of 6 RBs. For CORESETs other than CORESET #0, multiple chunks of 6 RBs may be either contiguous or non-contiguous, and the starting RB of a CORESET is determined based on section 10.1 in 3GPP TS36.213, which results in an aligned six-RB grid for the CORESETs a UE is configured to monitor. CORESET #0, which is configured during the initial access, may have 24, 48, or 96 RBs. Also, CORESET #0 must be contiguous in frequency domain, and it is not necessarily aligned with the six-RB grid.

A PDCCH is carried by 1, 2, 4, 8 or 16 Control Channel Elements (CCEs). The number of CCEs used for transmission of DCI are referred to as an Aggregation Level (AL). Each CCE is composed of 6 Resource Element Groups (REGs), and each REG is 12 resource elements (REs) in one OFDM symbol, as shown in FIG. 1. A REG bundle comprises 2, 3, or 6 REGs. Thus, a CCE may be composed of one or multiple bundles. FIG. 1 illustrates an example of a CORESET comprising 48 RBs and one symbol.

Each CORESET is associated with a CCE-REG mapping which may be interleaved or non-interleaved. In the non-interleaved case, all CCEs in an AL are mapped in consecutive REG bundles of the associated CORESET. In the interleaved case, REG bundles of CCEs are distributed on the frequency domain over the entire CORESET Bandwidth (BW). For CORESET #0, the CCE-REG mapping is always interleaved with predefined parameters.

CCEs Indices for PDCCH Candidates

In order to receive DCI, a UE needs to blindly decode PDCCH candidates potentially transmitted from the network using one or more search spaces. A search space comprises a set of PDCCH candidates where each candidate may occupy multiple CCEs. As mentioned above, the number of CCEs used for a PDCCH candidate is referred to as AL which in NR may be 1, 2, 4, 8, or 16. A higher AL provides higher coverage.

Which CCEs to use for a certain PDCCH candidate is determined by a hash function which is described in 3GPP TS 38.213, "NR; Physical layer procedures for control", V16.1.0, March 2020, as follows:

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i$$

$$L \cdot (Y_p + \lfloor k \cdot C/L \cdot M \rfloor) \mod \lfloor C/L \rfloor + i$$

where for any CSS, $Y_{p,n_{s,f}^\mu} = 0$;

for a USS, $Y_{p,n_{s,f}^\mu} = (A_p \cdot Y_{p,n_{s,f}^\mu - 1}) \bmod D$, $Y_{p,-1} = n_{RNTI} \neq 0$, $A_p = 39827$ for p mod 3=0, $A_p = 39829$ for p mod 3=1, $A_p = 39839$ for p mod 3=2, and D=65537;

i=0, ..., L−1;

$N_{CCE,p}$ is the number of CCEs, numbered from 0 to $N_{CCE,p} - 1$, in CORESET p;

$n_{CI}$ is the carrier indicator field value if the UE is configured with a carrier indicator field by CrossCarrierSchedulingConfig for the serving cell on which PDCCH is monitored; otherwise, including for any CSS, $n_{CI} = 0$;

$m_{s,n_{CI}} = 0, \ldots, M_{s,n_{CI}}^{(L)} - 1$, where $M_{s,n_{CI}}^{(L)}$ is the number of PDCCH candidates the UE is configured to monitor for aggregation level L of a search space set s for a serving cell corresponding to $n_{CI}$;

for any CSS, $M_{s,max}^{(L)} = M_{s,0}^{(L)}$;

for a USS, $M_{s,max}^{(L)}$ is the maximum of $M_{s,n_{CI}}^{(L)}$ over all configured $n_{CI}$ values for a CCE aggregation level L of search space set s;

the RNTI value used for $n_{RNTI}$ is the C-RNTI.

The above procedure establishes, for each PDCCH candidate with aggregation level L that the UE is required to monitor in a search space, the associated set of L CCEs, and thus the corresponding REGs and REs, to which the PDCCH candidate is mapped. When non-interleaved mapping is used, these L CCEs are confined to a localized set of RBs, where the number of RBs depends on the number of OFDM symbols configured for the CORESET.

CCE-REG Mapping

A UE may be configured with multiple CORESETs. Each CORESET is associated with one CCE-to-REG mapping only. Both interleaved and non-interleaved mappings may be used. For non-interleaved mapping, all CCEs for a DCI with AL L are mapped in consecutive REG bundles of the associated CORESET. For interleaved mapping, each CCE is split in frequency domain to provide diversity.

According to 3GPP TS 38.213, "NR; Physical layer procedures for control", V16.1.0, March 2020, the CCE-REG mapping is determined as follows:

REG bundle i is defined as REGs $\{iL, iL-1, \ldots, iL+L-1\}$ where L is the REG bundle size, i=0, 1, ..., $N_{REG}^{CORESET}/L - 1$, and $N_{REG}^{CORESET} = N_{RB}^{CORESET} N_{symb}^{CORESET}$ is the number of REGs in the CORESET CCE j consists of REG bundles $\{f(6j/L), f(6j/L+1), \ldots, f(6j/L+6/L-1)\}$ where $f(\cdot)$ is an interleaver.

For non-interleaved CCE-to-REG mapping, L=6 and f(x)=x.

For interleaved CCE-to-REG mapping, considering $N_{symb}^{CORESET}$ the CORESET duration, $L \in \{2,6\}$ for $N_{symb}^{CORESET} = 1$ and $L \in \{N_{symb}^{CORESET}, 6\}$ for $N_{symb}^{CORESET} \in \{2, 3\}$. The interleaver is defined by:

$$f(x) = (rC + c + n_{shift}) \bmod (N_{REG}^{CORESET}/L)$$

$$x = cR + r$$

$$r = 0, 1, \ldots, R-1$$

$$c = 0, 1, \ldots, C-1$$

$$C = N_{REG}^{CORESET}/(LR)$$

where $R \in \{2, 3, 6\}$.

L equals 6 for non-interleaved mapping $n_{shift} \in \{0, 1, \ldots, 274\}$ is given by the higher-layer parameter shiftIndex if provided, otherwise $n_{shift} = N_{ID}^{cell}$ (cell ID);

For CORESET #0 interleaved mapping is used with the following parameters: L=6; R=2: $n_{shift} = N_{ID}^{cell}$.

CORESET #0

Within CORESET #0, a UE searches for the Type0-PDCCH common search space to find the System Information Block 1 (SIB1) information. For Common Search Spaces (CSS) Type 0/Type0A/Type2, the possible ALs are: 4, 8, and 16. For each AL, there may be one or multiple possible candidates as listed in Table 1 from 3GPP TS 38.213, "NR; Physical layer procedures for control", V16.1.0, March 2020. CORESET #0 may have different configurations, with 24, 48, or 96 RBs.

TABLE 1

Number of PDCCH candidates for Type 0/Type0A/Type2 CSS (in NR).

| Aggregation level | Maximum number of PDCCH candidates for common search space |
|---|---|
| 4 | 4 |
| 8 | 2 |
| 16 | 1 |

As discussed earlier, the current NR CORESET #0 only supports interleaved CCE-REG mapping. Therefore, CCEs carrying PDCCH candidates are spread over the entire CORESET BW. As an example, FIG. 2 shows the locations of CCEs for PDCCH AL 4, in a one-symbol CORESET #0 with 48 RBs, for $N_{ID}^{cell} = 0$. Here, CCEs are indexed from 0 to 7. Before interleaving, indices of CCEs are: {0, 1, 2, ..., 7}, while after the interleaving the order of CCEs become: {0, 2, 6, 1, , 3, 5, 7}. Note that the left-most CCE has the lowest frequency and the right-most CCE has the highest frequency. FIG. 2 illustrates an example of interleaved CCEs in CORESET #0.

Table 2 shows different configurations and bandwidths of CORESET #0. As can be seen, the bandwidth of CORESET #0 may be up to 17.28 MHz in FR1 (15/30 kHz SCS) and 69.12 MHz in FR2 (60/120 kHz SCS).

TABLE 2

Different configurations of CORESET #0 in NR.

| SCS/ CORESET duration | one symbol | two symbols | three symbols |
|---|---|---|---|
| 15 kHz | 48 RBs (8.64 MHz) | 24 RBs (4.32 MHz) | 24 RBs (4.32 MHz) |
|  | 96 RBs (17.28 MHz) | 48 RBs (8.64 MHz) | 48 RBs (8.64 MHz) |
|  |  | 96 RBs (17.28 MHz) | 96 RBs (17.28 MHz) |
| 30 kHz | 48 RBs (17.28 MHz) | 24 RBs (8.64 MHz) | 24 RBs (8.64 MHz) |
|  |  | 48 RBs (17.28 MHz) | 48 RBs (17.28 MHz) |
| 60 kHz | 48 RBs (34.56 MHz) | 48 RBs (34.56 MHz) | 48 RBs (34.56 MHz) |
|  | 96 RBs (69.12 MHz) | 96 RBs (69.12 MHz) |  |
| 120 kHz | 48 RBs (69.12 MHz) | 24 RBs (34.56 MHZ) | Not supported |
|  |  | 48 RBs (69.12 MHz) |  |

SUMMARY

As a part of developing embodiments herein a problem was identified by the inventors and will first be discussed.

A UE bandwidth reduction is identified as one of the important ways to reduce the UE complexity as well as power consumption. However, it is highly desired to reuse the existing control channels and in particular CORESET #0. There are several advantages in terms of coverage, scheduling flexibility and capacity to use the same CORESET#0 for both legacy NR UEs and low-complexity, and/or low cost and/or reduced BW UEs, UEs of smaller bandwidth. At the same time, this creates a problem for a low-complexity UE that only supports smaller bandwidth than the bandwidth required for CORESET #0. Due to the limited number of bits in MIB, only a limited number of configurations of CORESET #0 are supported. Using a smaller CORESET #0 is not always preferred due to the limited capacity. Therefore, there is a need for methods to enable the UE with reduced BW to receive the control information from the CORESET #0 which has larger bandwidth than the UE supports, e.g., for system information acquisition. For example, Table 3 below shows various configurations which cannot be fully supported due to the limited UE bandwidth. In this case, there is a need for methods to enable the UE with reduced BW to receive CORESET which has larger bandwidth than the UE BW, while minimizing the performance degradation.

TABLE 3

Different configurations which are not fully supported due to further UE bandwidth reduction (channel BW exceeds the UE BW).

| Channel/signal | 5 MHZ UE BW | 3 MHz UE BW | 1 MHz UE BW |
|---|---|---|---|
| CORESET #0 (15 KHz SCS) | Not supported (48 and 96 PRBs) | Not supported | Not supported |
| CORESET #0 (30 KHz SCS) | Not supported | Not supported | Not supported |

An object of embodiments herein is improve the way of receiving CORESETs for a UE operating with reduced bandwidth in a wireless communications network.

According to an aspect of embodiments herein, the object is achieved by a method performed by a UE for handling a CORESET from a network node in a wireless communications network. The UE operates with a reduced bandwidth. The UE detects a CORESET from the network node, and that a bandwidth of the CORESET is larger than the bandwidth of the UE. PDCCH candidates are transmitted in the CORESET. The UE determines which part of the CORESET to skip, to make the bandwidth of the CORESET equal or smaller than the bandwidth of the UE, such that the UE is capable to receive the CORESET. The part of the CORESET to be skipped is determined based on a predicted decoding performance of the PDCCH candidates in the CORESET.

According to another aspect of embodiments herein, the object is achieved by a method performed by a network node for handling CORESETs in a wireless communications network. The network node sends a CORESET to a UE. The UE operates with a reduced bandwidth. When a bandwidth of the CORESET is larger than the bandwidth of the UE, the network node receives a message from the UE. The message indicates a part or parts of the CORESET that are determined to be skipped in order to make the bandwidth of the CORESET equal or smaller than the bandwidth of the UE, such that the UE is capable to receive the CORESET. The network node schedules PDCCH candidates in a second CORESET. The scheduling is based on the indicated part or parts of the CORESET that are determined to be skipped. The scheduling is further based on a bandwidth of a second UE, a position of the bandwidth, and a predicted decoding performance of the PDCCH candidates at a receiver of the second UE. The scheduling is performed such that the bandwidth of the second CORESET is equal or smaller than a bandwidth of the second UE operating with a reduced bandwidth. The network node sends the second CORESET to the second UE as scheduled.

According to another aspect of embodiments herein, the object is achieved by a UE configured to handle a CORESET, from a network node in a wireless communications network. The UE is adapted to operate with a reduced bandwidth. The UE is further configured to:

Detect a CORESET from the network node, and that a bandwidth of the CORESET is larger than the bandwidth of the UE, wherein PDCCH candidates are adapted to be transmitted in the CORESET, determine which part of the CORESET to skip, to make the bandwidth of the CORESET equal or smaller than the bandwidth of the UE, such that the UE is capable to receive the CORESET, and wherein the part of the CORESET to be skipped is adapted to be determined based on a predicted decoding performance of the PDCCH candidates in the CORESET.

According to another aspect of embodiments herein, the object is achieved by a network node configured to handle CORESETs in a wireless communications network. The network node is further configured to:

Send a CORESET to a UE, which UE is adapted to operate with a reduced bandwidth, when a bandwidth of the CORESET is larger than the bandwidth of the UE, receive a message from the UE, which message is adapted to indicate a part or parts of the CORESET that are determined to be skipped in order to make the bandwidth of the CORESET equal or smaller than the bandwidth of the UE, such that the UE is capable to receive the CORESET, schedule PDCCH candidates in a second CORESET, based on the indicated part or parts of the CORESET that are determined to be skipped, a bandwidth of a second UE and a position of the bandwidth, and a predicted decoding performance of the PDCCH candidates at a receiver of the second UE, such that the bandwidth of the second CORESET is adapted to be equal or smaller than a bandwidth of the second UE operating with a reduced bandwidth, and send the second CORESET to the second UE as scheduled.

Thanks to that the UE has determined which part of the CORESET to skip based on a predicted decoding performance of the PDCCH candidates in the CORESET, which will make the bandwidth of the CORESET equal or smaller than the bandwidth of the UE, the UE will be capable to receive the CORESET. In this way a CORESET with a bandwidth that is larger than the bandwidth of the UE can be received by the UE while minimizing the decoding performance degradation of the PDCCH candidates in the CORESET. This results in an improved way of receiving CORESETs for the UE operating with reduced bandwidth in the wireless communications network.

BRIEF DESCRIPTION OF THE DRAWINGS

Examples of embodiments herein are described in more detail with reference to attached drawings in which:

FIG. 4 is a flowchart depicting an embodiment of a method in a UE.

FIGS. 18-21 are flowcharts illustrating methods implemented in a communication system including a host computer, a base station and a user equipment.

DETAILED DESCRIPTION

Embodiments herein may relate to a downlink control channel for reduced bandwidth UEs.

Embodiments herein provide effective mechanisms that enable reduced BW UEs to receive a CORESET which is larger than the UE receiver bandwidth. In particular, the provided methods determine a portion of a CORESET to be skipped at the UE while ensuring a minimum impact on the PDCCH decoding performance. The resource skipping techniques exploit various information such as CORESET parameters, cell-ID, and UE received BW to determine a set of resources which should be skipped within the CORESET at the receiver.

An advantage of embodiments herein is that a reduced BW UE is capable of effectively monitor PDCCH candidates transmitted in a CORESET whose bandwidth exceeds the UE BW. Specifically, by efficiently arrange the resources carrying the PDCCH, e.g., skipping RBs in a specific pattern in the CORESET at the receiver, the reduced BW UEs are able to monitor and decode PDCCH candidates. The provided techniques according to embodiments herein are particularly useful when the CORESET, e.g., CORESET #0, is shared between legacy UEs and reduced BW UEs. Hence, the embodiments provided herein are beneficial for network resource utilization and PDCCH decoding performance for reduced BW UEs. The embodiments provided herein are important for supporting ultra-low cost, low power, and low complexity devices in 5G evolution towards 6G.

Figure 3:
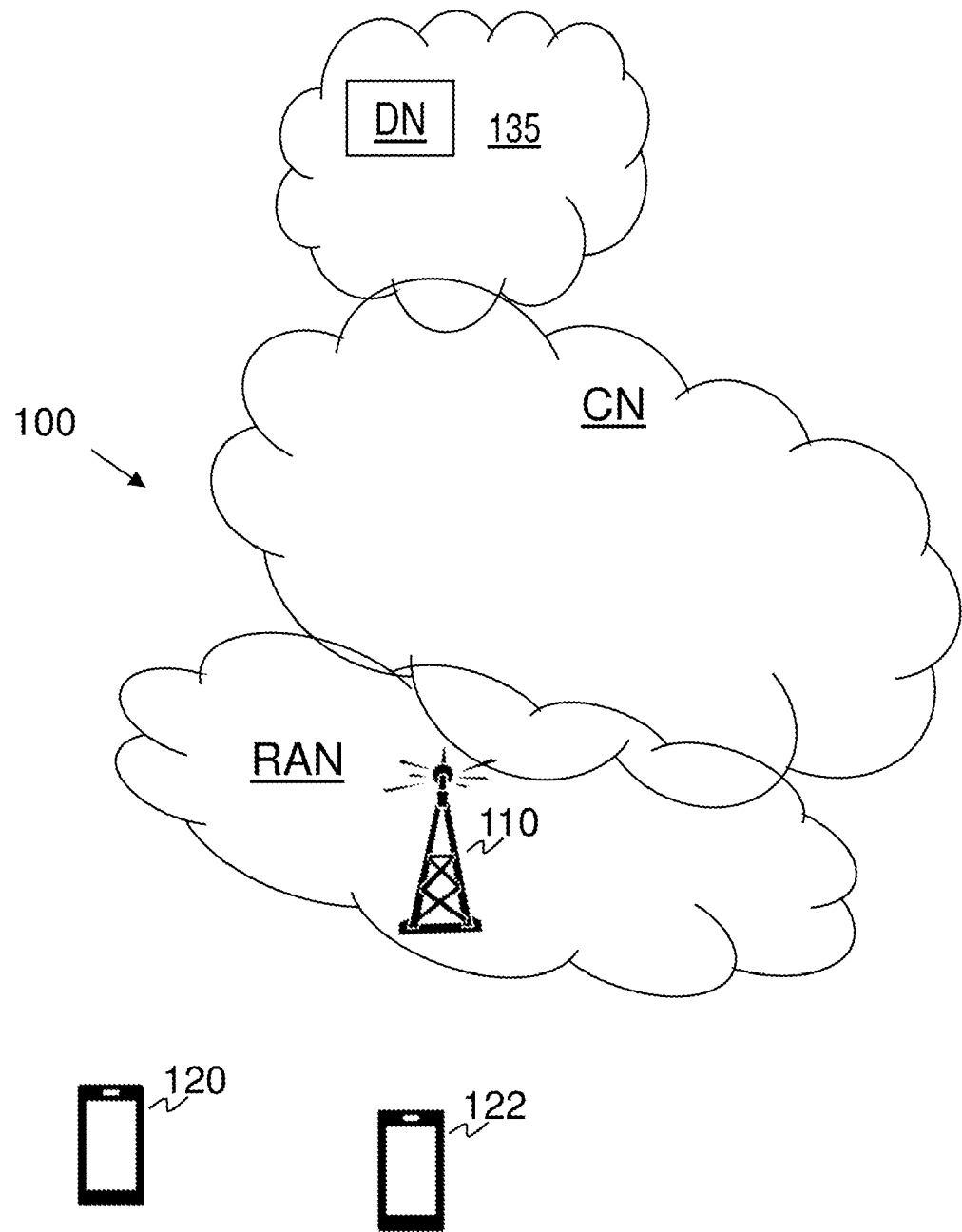
FIG. 3 is a schematic block diagram illustrating embodiments of a wireless communications network.

FIG. 3 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, 6G, Wi-Fi, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes, such as a network node 110, operate in the wireless communications network 100. The network node 110 e.g. provides a number of cells and may use these cells for communicating with e.g. a UE 120 and/or a second UE 122. The network node 110 may be a transmission and reception point e.g. a radio access network node such as a base station, e.g. a radio base station such as a NodeB, an evolved Node B (eNB, eNodeB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE served by the network node 110 depending e.g. on the radio access technology and terminology used. The network node 110 may further be able to control, e.g. schedule, communication on a number of SL beams between UEs, e.g. the UE 120 and the second UE 122.

UEs operate in the wireless communications network 100, such as e.g. a UE 120 and/or a second UE 122. The UE 120 and the second UE 122 may operate with a reduced bandwidth and may be referred to as reduced BW UEs herein. Any one or both of the UE 120 and the second UE 122 may respectively e.g. be an NR device, a mobile station, a wireless terminal, an NB-IoT device, an enhanced Machine Type Communication (eMTC) device, an NR RedCap device, a CAT-M device, a Vehicle-to-everything (V2X) device, Vehicle-to-Vehicle (V2V) device, a Vehicle-to-Pedestrian (V2P) device, a Vehicle-to-Infrastructure (V2I) device, and a Vehicle-to-Network (V2N) device, a Wi-Fi device, an LTE device and a non-access point (non-AP) STA, a STA, that communicates via a base station such as e.g. the network node 110, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Figure 1:
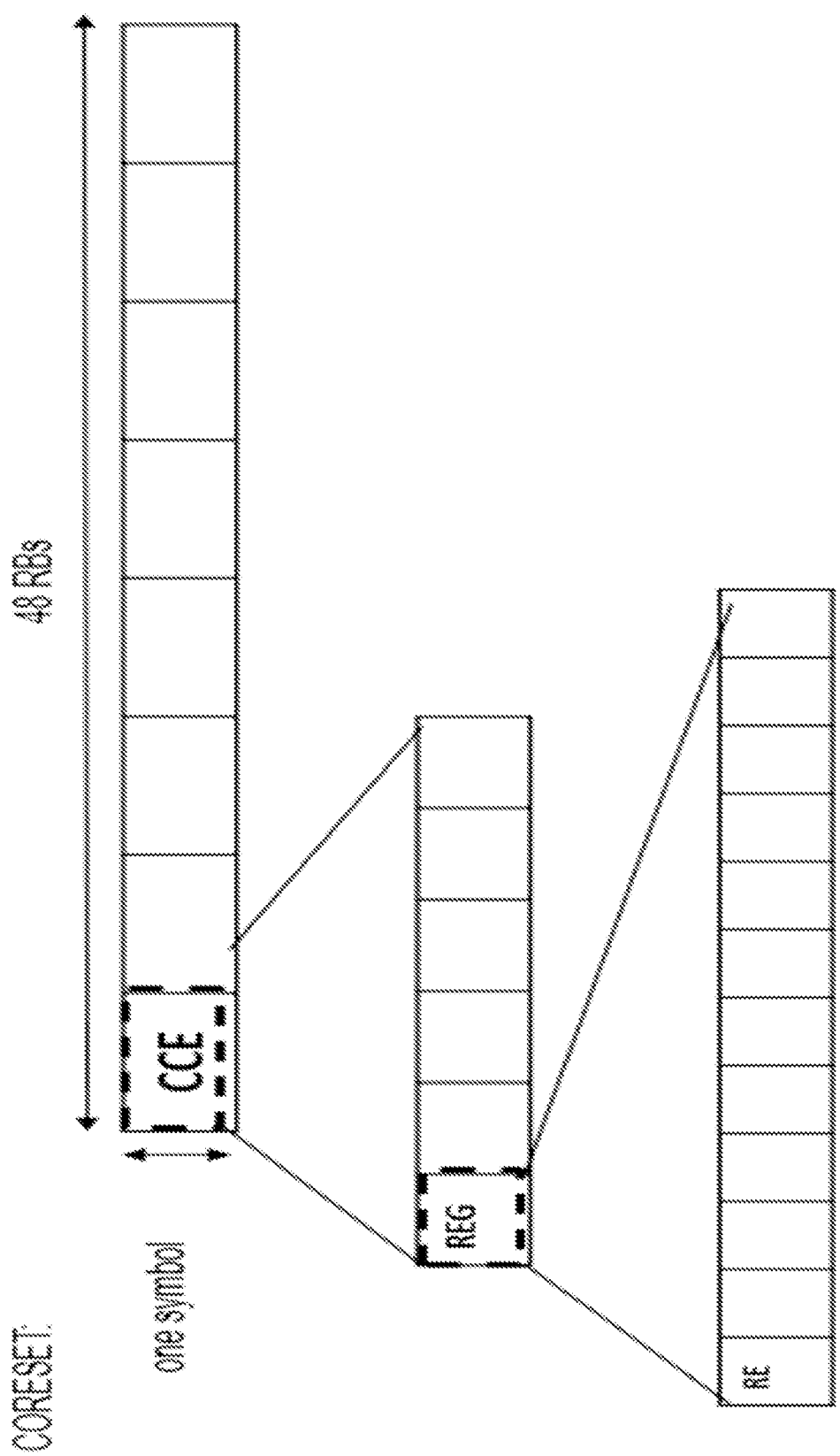
FIG. 1 is a schematic block diagram illustrating prior art.
Figure 2:
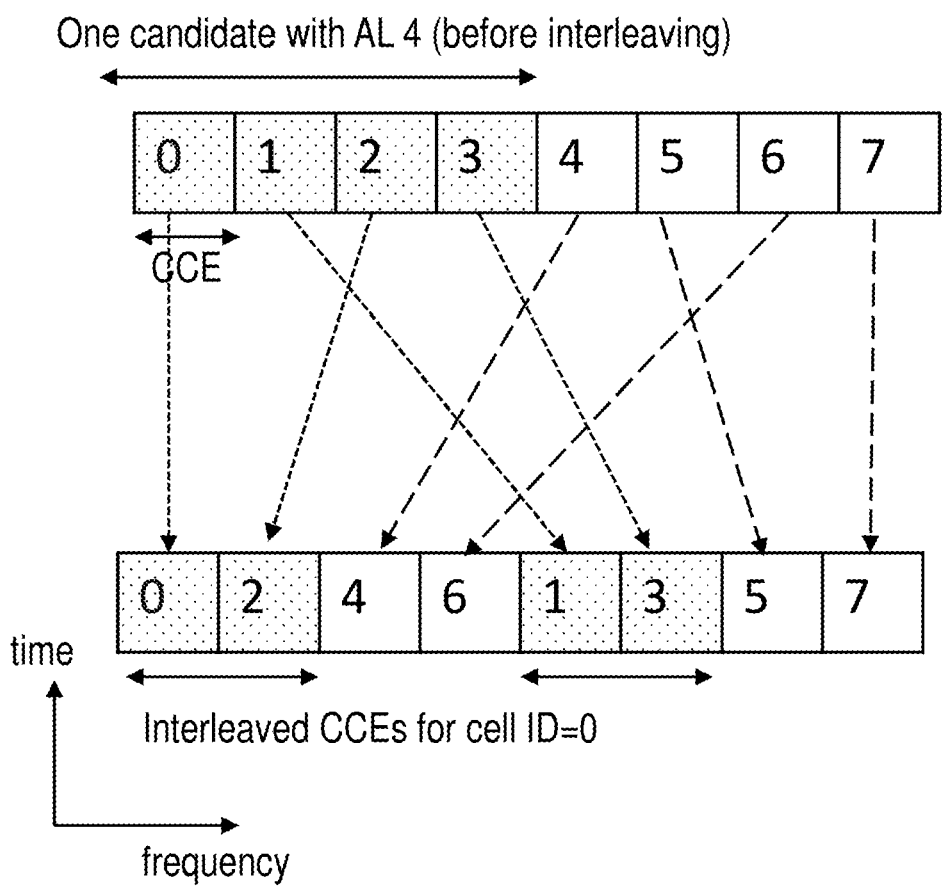
FIG. 2 is a schematic block diagram illustrating prior art.

Methods herein may in one aspect be performed by the UE 120, in another aspect by the network node 110. As an alternative, a Distributed Node (DN) and functionality, e.g. comprised in a cloud 135 as shown in FIG. 2, may be used for performing or partly performing the methods of embodiments herein.

According to embodiments herein, reduced BW UEs such as the UE 120, may decode PDCCH candidates transmitted in a CORESET whose BW exceed the UE received BW. Provided methods according to embodiments herein enable the UE 120 to efficiently skip a portion of a CORESET which has a minimum impact on the PDCCH decoding performance. The network node 110 may also effectively support legacy UEs and reduced BW UEs using a shared CORESET which is beneficial from resource utilization perspective.

A number of embodiments will now be described, some of which may be seen as alternatives, while some may be used in combination.

Method in the UE 120

FIG. 4 shows example embodiments of a method performed by the UE 120. The method is for handling a CORESET from the network node 110 in the wireless communications network 100. The UE 120 operates with a reduced bandwidth. The reduced bandwidth may e.g., comprise MHz or 3 MHz in FR1, and 50 MHz or 40 MHz in FR2.

The method comprises the following actions, which actions may be taken in any suitable order. Optional actions are referred to as dashed boxes in FIG. 4.

Action 401

The UE 120 detects a CORESET from the network node 110. The UE 120 further detects that a bandwidth of the CORESET is larger than the bandwidth of the UE 120. PDCCH candidates are transmitted in the CORESET. The CORESET bandwidth may be determined by pre-defined and/or known bandwidth, number of resource blocks, and Subcarrier Spacing (SCS) of the CORESET E.g., the UE 120 may know that the bandwidth of the CORESET may be 4.32 MHz, 8.64 MHz, or 17.28 MHz and it may compare with its maximum bandwidth.

This means that the UE 120 is not capable to receive the CORESET since it is too large. However, if the UE 120 according to embodiments herein, reduces the CORESET by skipping a part of it which then not will be received or decoded, the UE 120 will be capable to receive the reduced CORESET. See below actions.

Action 402

The UE 120 would be capable to receive the CORESET if the bandwidth of the CORESET is equal or smaller than the bandwidth of the UE 120. The UE 120 determines which part of the CORESET to skip, to make the bandwidth of the CORESET equal or smaller than the bandwidth of the UE 120, such that the UE 120 is capable to receive the CORESET. It should be noted that the UE 120 may determine which part of the CORESET to skip by obtaining the determined part of the CORESET to skip from a network node or a distributed node.

The wording "skip a part of the CORESET to be received" when used herein means that the UE 120 ignores, punctures, or not receives that part of CORESET and only receives and decodes the remaining parts. The part of the CORESET to be skipped is determined based on a predicted decoding performance of the PDCCH candidates in the CORESET. The UE 120 will not just skip any part of the CORESET, the UE 120 will consider the predicted decoding performance of the PDCCH candidates in the CORESET. The UE 120 may then determine to skip the part that affects the predicted decoding performance as little as possible and, in this way, receive the part of the CORESET that gives the best decoding performance. This will be explained more in detail below.

It is an aim for the UE 120 to determine the skipped part such that it involves as small as possible impact on the decoding performance of the PDCCH candidates in the CORESET when received. In some embodiments this may comprise that the determining of which part of the CORESET to be skipped is performed such that the predicted decoding performance of the PDCCH candidates in the CORESET achieves a performance that is any one out of:
  above a first threshold,
  as high as possible above the first threshold, or
  such that an impact on the decoding is minimized,
  such that a worst-case impact is minimized or
  such that an average impact is minimized.

The decoding performance of the PDCCH candidates in the CORESET may be predicted based on any one or more out of: an error probability of the decoding, parameters and configuration related to the CORESET, battery life of the UE 120, UE 120 performance requirements, UE 120 center frequency position, carrier bandwidth, UE 120 capabilities, and UE 120 bandwidth.

In some embodiments, the UE 120 determines which part of the CORESET to be skipped further based on any one or more out of:
  Parameters related to the CORESET,
  the positions of all PDCCH candidates comprised in the CORESET
  the position of a PDCCH candidate which is most affected by being skipped,
  the position of CCEs used for the PDCCH candidates which are most affected by being skipped, and
  whether or not the CORESET is interleaved.

In some embodiments, the UE 120 determines which part of the CORESET to be skipped by determining which part or parts of the CORESET to be skipped. This means that the part of the CORESET to be skipped comprises one or more parts. The UE 120 may e.g., determine different parts of the CORESET to be skipped.

In some of these embodiments, the part or parts of the CORESET to be skipped comprises any one out of:
  the first K Resource Blocks, RBs, of the CORESET,
  the last K RBs of the CORESET,
  the first $K_L$ RBs and the last $K_R$ RBs of the CORESET,
  the first q subcarriers of the CORESET,
  the last q subcarriers of the CORESET,
  the first $q_L$ subcarriers and the last $q_R$ subcarriers of the CORESET.

In some embodiments, the parts of the CORESET to be skipped comprises the first $q_L$ subcarriers and the last $q_R$ subcarriers of the CORESET, wherein:
  one half of the subcarriers to be skipped are comprised in the first $q_L$ subcarriers, and
  the other half of the subcarriers to be skipped are comprised in the last $q_R$ subcarriers of the CORESET.

In some alternative embodiments, the parts of the CORESET to be skipped comprises the first $K_L$ RBs and the last $K_R$ RBs of the CORESET, wherein:
  one half of the RBs to be skipped are comprised in the first $K_L$ RBs, and
  the other half of the RBs to be skipped are comprised the last $K_R$ RBs of the CORESET.

It should be noted that determining which part of the CORESET to skip and receive the rest of the parts of the CORESET, may also cover determining which part of the CORESET to receive and skip the rest of the parts of the CORESET.

Action 403

The UE 120 sends a message to the network node 110. The message may indicate the part or parts of the CORESET that are determined to be skipped in order to make the bandwidth of the CORESET equal or smaller than the bandwidth of the UE 120, such that the UE 120 is capable to receive the CORESET.

The network node 110 may use this information when scheduling PDCCH candidates in other CORESETs to other UEs such as the second UE 122. This will be described below.

Action 404 May

In some embodiments, subsequent CORESET from the network node 110 are detected in a periodicity comprising a time interval. In some of these embodiments, the UE 120 changes the skipped part or parts of the subsequent CORESET within the time interval, so that the skipped part or parts of the CORESET in some or all of the subframes are non-overlapping or partially overlapping.

This makes it possible for the UE 120 to receive different parts of the CORESET at different times which may be combined and then construct the entire CORESET. This an advantage since the entire CORESET can be decoded thus preventing the performance loss.

Action 405

When the UE 120 has skipped the determined part of the CORESET and made the bandwidth of the CORESET equal or smaller than the bandwidth of the UE 120, the UE 120 is capable of receiving it. Thus, the UE 120 may receive the CORESET in which the determined part or parts are skipped.

In some embodiments, when receiving the CORESET in which the determined part or parts are skipped, the UE 120 may position its limited bandwidth according to any one out of: Such that a starting RB aligns with the starting RB of the CORESET, or such that the ending RB aligns with the ending RB of the CORESET.

Method in the Network Node 110

Figure 5:
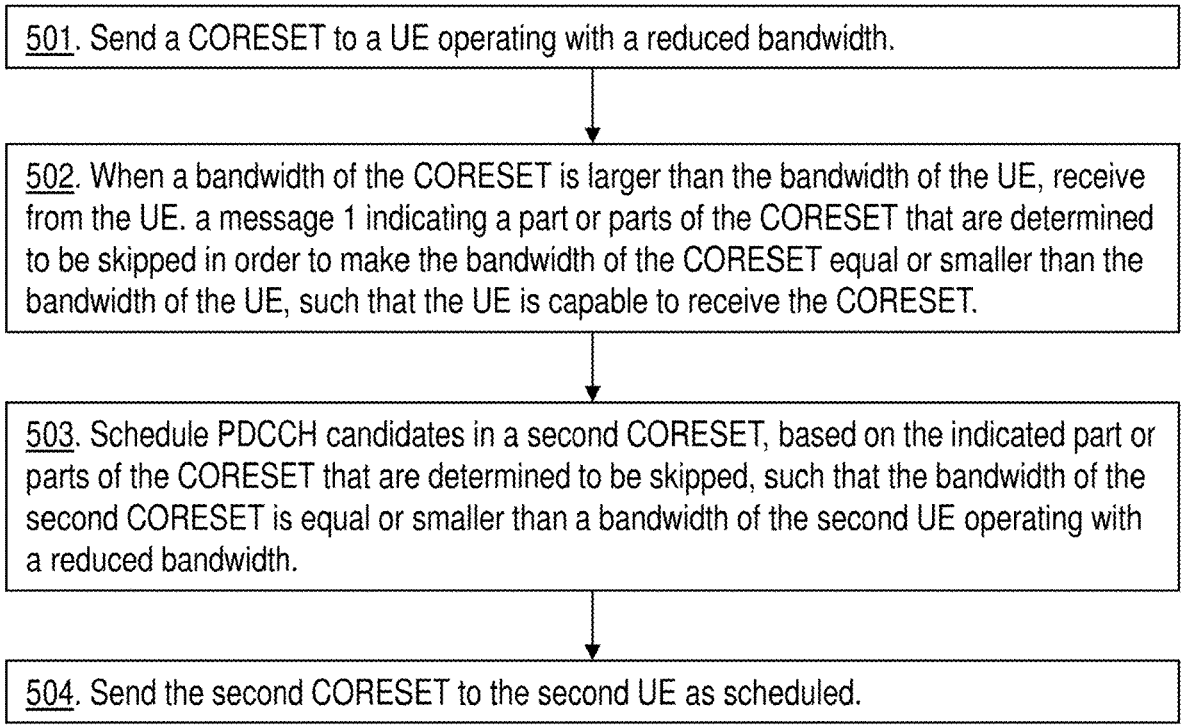
FIG. 5 is a flowchart depicting an embodiment of a method in a network node.

FIG. 5 shows example embodiments of a method performed by the network node 110. The method is for handling CORESETs in the wireless communications network 100. The method comprises the following actions, which actions may be taken in any suitable order. Optional actions are referred to as dashed boxes in FIG. 5.

Action 501

The network node 110 sends a CORESET to the UE 120. The UE 120 operates with a reduced bandwidth.

The CORESET will be detected by the UE 120 as described above.

Action 502

When a bandwidth of the CORESET is larger than the bandwidth of the UE 120, the network node 110, receives a message from the UE 120. The message indicates a part or parts of the CORESET that are determined to be skipped in order to make the bandwidth of the CORESET equal or smaller than the bandwidth of the UE 120, such that the UE 120 is capable to receive the CORESET.

In some embodiments, the part or parts of the CORESET to be skipped comprises any one out of:
the first K Resource Blocks, RBs, of the CORESET,
the last K RBs of the CORESET,
the first $K_L$ RBs and the last $K_R$ RBs of the CORESET,
the first q subcarriers of the CORESET,
the last q subcarriers of the CORESET,
the first $q_L$ subcarriers and the last $q_R$ subcarriers of the CORESET. In some embodiments, the parts of the CORESET to be skipped comprises the first $q_L$ subcarriers and the last $q_R$ subcarriers of the CORESET, wherein one half of the subcarriers to be skipped are comprised in the first $q_L$ subcarriers, and the other half of the subcarriers to be skipped are comprised in the last $q_R$ subcarriers of the CORESET.

In some embodiments, the parts of the CORESET to be skipped comprises the first $K_L$ RBs and the last $K_R$ RBs of the CORESET, wherein one half of the RBs to be skipped are comprised in the first $K_L$ RBs, and the other half of the RBs to be skipped are comprised the last $K_R$ RBs of the CORESET.

Action 503

The network node 110 schedules PDCCH candidates in a second CORESET.

This is a CORESET for another UE, the second UE 122. The network node 120 will learn from the skipped part of the earlier CORESET to the UE 120, to schedule the second CORESET for the second UE 122 which also operates with a reduced bandwidth. The PDCCH candidates in a second CORESET are scheduled, based on the indicated part or parts of the CORESET that are determined to be skipped. The PDCCH candidates in a second CORESET are scheduled further based on a bandwidth of the second UE 122, a position of said bandwidth, and a predicted decoding performance of the PDCCH candidates at a receiver of the second UE 122. The PDCCH candidates in the second CORESET are scheduled such that the bandwidth of the second CORESET is equal or smaller than a bandwidth of the second UE 122 operating with a reduced bandwidth.

Action 504

The network node 110 then sends the second CORESET to the second UE 122 as scheduled.

The above embodiments will now be further explained and exemplified below. The embodiments below may be combined with any suitable embodiment above.

As mentioned above, the UE 120 detects 401 a CORESET from the network node 110. It further detects that a bandwidth of the CORESET is larger than the bandwidth of the UE 120.

As discussed above, the reduced BW UEs such as the UE 120 detects that it may only receive parts of the CORESET, e.g. the CORESET#0, configured for a legacy NR UE. Due to redundancy introduced in the channel coding, the UE 120 may still recover the information by not receiving all the RBs, may also be partial RBs, of the CORESET #0 i.e. skip a part of the CORESET#0. Specifically, at high SNRs the PDCCH decoding probability may still be high despite losing several RBs. It should be noted that the PDCCH decoding performance may depend on various factors such as e.g. AL, interleaving pattern, and/or channel coding, as well as the set of RBs used for the decoding.

Figure 6:
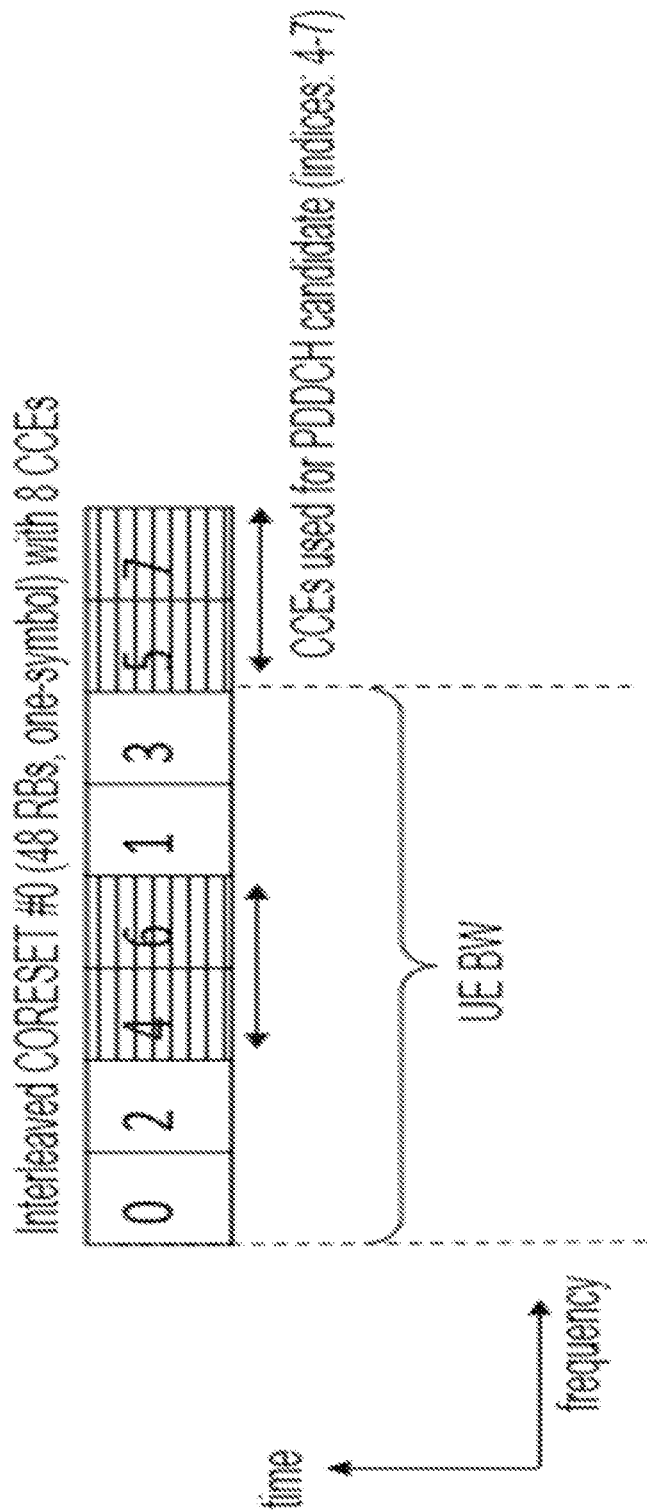
FIG. 6 is a schematic block diagram illustrating embodiments herein.

As a non-limiting illustrative example in FIG. 6, consider a PDCCH transmission on CORESET #0 with 48 RBs and one symbol. In this example, an AL 4 with CCEs indices 4, 6, 5, 7 marked with striped boxes in FIG. 6, after interleaving is used for the transmitted PDCCH candidate. The CCEs indices 4, 6, 5, 7 are interleaved with CCEs indices 0, 1, 2, 3 marked with non-striped boxes in FIG. 6. If the UE 120 bandwidth and its position is such that the UE 120 can only receive the first five CCEs (indices 0, 2, 4, 6, 1 in this example), whereby the CCEs 5 and 7 which carry the PDCCH candidate will be lost. This, in turn, may significantly impact the PDCCH decoding performance.

FIG. 6 illustrates an example when the UE 120 has detected that a bandwidth of the CORESET is larger than the bandwidth of the UE 120 so it cannot receive a portion (or entire) of PDCCH transmitted in the CORESET.

The UE 120 is not aware of the exact location of the transmitted PDCCH candidate thus it needs to perform blind decoding over various possible candidates. For a BW limited UE such as the UE 120, some of the candidates can be severely affected when receiving the entire CORESET is not feasible. Such worst-case scenarios need to be also handled by UE to ensure a minimum performance loss.

Some First Embodiments Relating to Efficient Skipping or Puncturing a Part of the CORESET From the UE point of view, if the UE 120 cannot receive the full CORESET, e.g. a full CORESET #0, because of its reduced bandwidth, the UE 120 may determine to skip a part of it such that it receives the part of the CORESET #0 which gives the best decoding performance. Another way of saying, the UE 120 may choose to receive a set of resources (at RBs and/or REs) at the receiver less than the resources used by the CORESET #0. This may e.g. be done at RB-level and/or RE-level. The goal for the UE 120 is to determine, e.g. identify, which part of the CORESET, e.g. which resources, to be received in order to ensure a minimum performance loss in the PDCCH decoding.

It should be noted that determining which part of the CORESET to skip and receive the rest of the parts of the CORESET, may also cover determining which part of the CORESET to receive and skip the rest of the parts of the CORESET.

As an example, let $B_u$, $R_u$, and $S_u$ be the bandwidth, number of RBs, and number subcarriers of the UE 120. Similarly, let $B_c$, $R_c$, and $S_c$ be the bandwidth, number of RBs, and number subcarriers of the CORESET used for transmitting PDCCH candidates. When $B_u<B_c$, the UE 120 needs to skip a number of RBs, or REs, of the CORESET but receive the rest. At RB-level, the number of skipped RBs is ($R_c-R_u$), and at RE-level, the number of skipped REs is ($S_c-S_u$). It is recommended for the UE 120 to carefully determine, e.g. identify, a part of the CORESET, e.g. comprising a set of received resources to be skipped, to ensure a minimum impact on PDCCH decoding performance. It should be noted that the UE 120 may need to perform blind decoding only on PDCCH candidates which have fully or partially overlapping resources with the UE 120 bandwidth.

Figure 7:
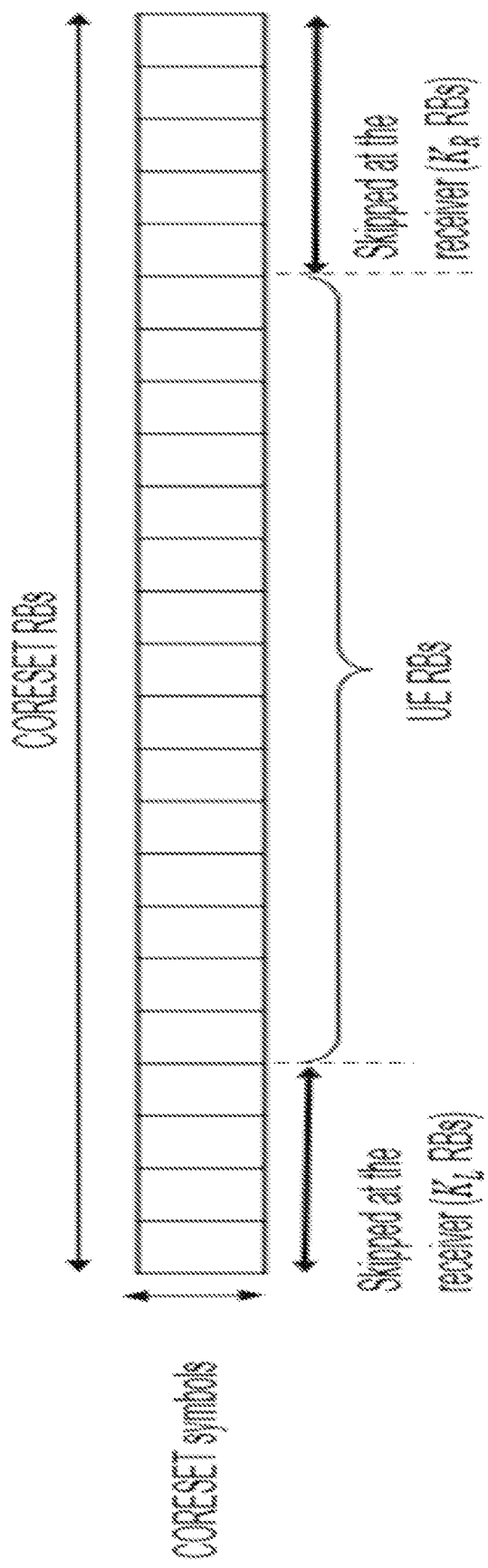
FIG. 7 is a schematic block diagram illustrating embodiments herein.

To avoid bandwidth fragmentation, the reduced bandwidth UE 120 may preferably consider receive contiguous RBs. Hence, a starting point and a number of received RBs may be determined, also referred to as defined, for the reduced bandwidth UE 120 to receive the PDCCH carried by a wider CORESET. This results in RBs at the right-side, e.g., RBs with high indices, and/or left-side, e.g., RBs with low indices, of the CORESET are skipped (not received by the reduced BW UE). As an illustrative example, FIG. 7 shows the skipping parts of the CORESETs comprising skipping of $K_L$ RBs on the left-side and $K_R$ RBs on the right-side of the CORESET.

Let K be the total number of RBs and q be the total number of subcarriers of the CORESET which the UE 120 need to skip at its receiver. The values of K and q are determined based on the UE BW and the CORESET BW.

The reduced bandwidth UE 120 may receive PDCCH carried by a wider CORESET at the receiver. This may be done at least in one of the following ways:

The first K RBs (lowest indices) of the CORESET are skipped.

The last K RBs (highest indices) of the CORESET are skipped.

The first $K_L$ RBs and the last $K_R$ RBs of the CORESET are skipped. It may be but not necessary the case $K_L+K_R=K$.

The first q subcarriers (lowest indices) of the CORESET are skipped.

The last q subcarriers (highest indices) of the CORESET are skipped.

The first $q_L$ subcarriers and the last $q_R$ subcarriers of the CORESET are skipped. It may be but not necessary the case $q_L+q_R=q$ In this regard, the values of $K_L$, $K_R$ (similarly $q_L$ and $q_R$) may be properly determined by the UE 120 to ensure a minimum predicted PDCCH decoding performance loss. The predicted performance loss e.g., depends on the ratio of the number of resources that are not received by UE 120, and those that are used for PDCCH. As discussed in above, the positions of CCEs used for a PDCCH candidate depends on the CORESET parameters, CCE-REG mapping, and AL. Also, for an AL with multiple candidates, the indices of used CCEs will be different. In case of interleaved CCE-REG mapping, the interleaving pattern depends on the cell ID.

According to some embodiments herein, when the bandwidth of the CORESET is larger than the UE 120 bandwidth, the UE 120 determines which parts, such as which of the resources, within the bandwidth of the CORESET, e.g. the CORESET #0, to skip, so that the UE 120 is able to decode the PDCCH with an acceptable performance, e.g. related to error probability. This error probability may be decided by the UE 120 performance requirement, e.g., specified in the standards, or the UE 120 may determine by itself, e.g., based on service, battery life, etc., requirements.

Furthermore, the part of the CORESET to be skipped, as an alternative to be received, by the UE 120 may also be determined based on the cell ID and other CORESET parameters.

Alternately, the part of the CORESET to be skipped, as an alternative to be received, by the UE 120 may also be determined based on the positions of all PDCCH candidates. In this case, the average performance loss is minimized.

Alternately, the UE 120 may skip a part comprising RBs or REs based on the position of the PDCCH candidate which may be affected most. In this case, the maximum number of skipped PDCCH resources is minimized. This corresponds to worst-case loss minimization.

If there are multiple sets of RBs (or REs) which can be skipped based on the proposed approach, the UE 120 may randomly select one set.

Alternatively, if there are multiple sets of RBs (or REs) which can be skipped based on the proposed approach, the UE may select a set comprising its preferred bandwidth, or center frequency, position.

In the following, non-limiting examples are provides to illustrate embodiments herein. Let's consider that the CORESET is represented by a CORESET #0 with 48 RBs and one OFDM symbol which comprises 8 CCEs. Consider two PDCCH candidates with AL 4 which is transmitted within the CORESET. Assume the reduced bandwidth UE 120 has 36 RBs hence it can only receive 6 CCEs. In this case, the UE 120 need to determine to skip 12 RBs, which is 2 CCEs here.

Figure 8:
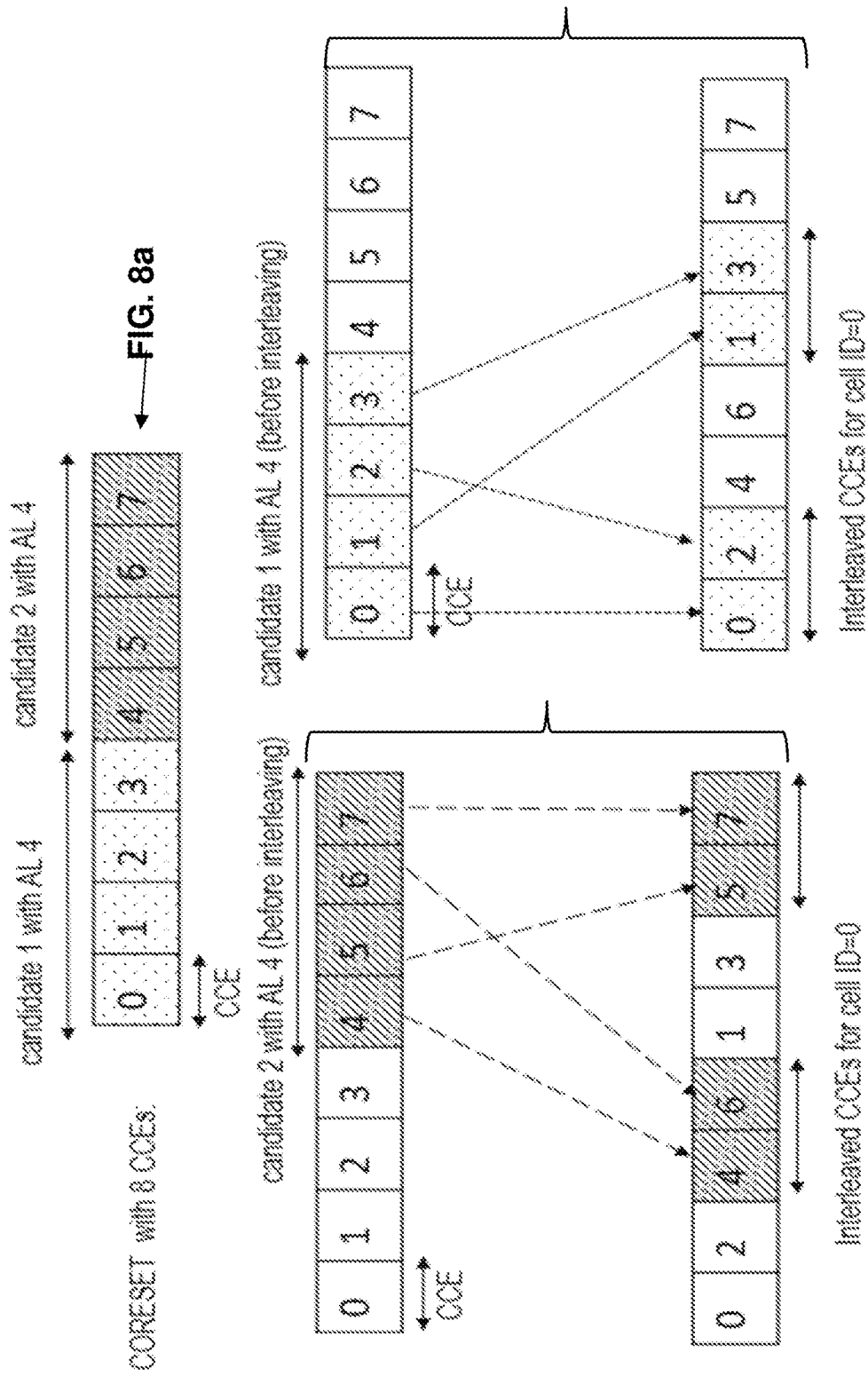
FIGS. 8a-c are schematic block diagrams illustrating embodiments herein.

FIGS. 8a, b and c show the positions of interleaved CCEs for each of two PDCCH candidates for cell-ID=0 in a CORESET.

FIG. 8a illustrates a CORESET of 8 CCEs comprising a first PDCCH candidate 1 with AL4 comprising CCEs 0, 1, 2, 3 which are marked with dotted boxes, and the second PDCCH candidate 2 with AL4 comprising CCEs 4, 6, 5, 7 which are marked with diagonally striped boxes. FIG. 8a depicts the CORESET before the interleaving.

The CCEs 0, 1, 2, 3 4, 6, 5, 7 in the CORESET are then interleaved.

FIG. 8b illustrates the CCE positions before and after the interleaving. FIG. 8b focuses on the first PDCCH candidate 1 with AL4 comprising the CCEs 0, 1, 2, 3 which are marked with dotted boxes. The other boxes comprising the second candidate CCEs 4, 5, 6, 7 have no texture.

FIG. 8c illustrates the same CCE positions before and after the interleaving. But FIG. 8c focuses on the second PDCCH candidate 2 with AL4 comprising the CCEs 4, 5, 6, 7 which are marked with diagonally striped boxes. The other boxes comprising the first candidate CCEs 0, 1, 2, 3 have no texture.

Figure 9:
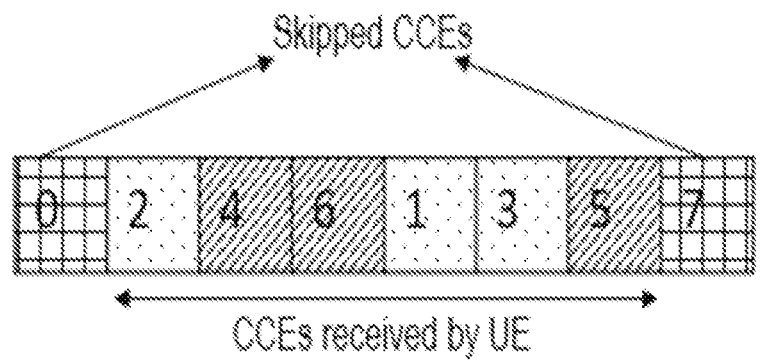
FIG. 9 is a schematic block diagram illustrating embodiments herein.

FIG. 9 illustrates an efficient approach for receiving a portion of CORESET for cell-ID=1. According to the example, the UE 120 determines to skip CCEs 0 and 7 which are marked with checked boxes, as depicted in FIG. 9. Then the the bandwidth of the CORESET is equal or smaller than the bandwidth of the UE 120, and the UE 120 is capable to receive the CORESET. As shown in FIG. 9, the UE receives 3 CCEs of each PDCCH candidate with AL 4, the CCEs 1, 2, 3 of the first PDCCH candidate 1, which are marked with dotted boxes, and CCEs 4, 6, 5 of the second PDCCH candidate 2, which are marked with diagonally striped boxes. This ensures the minimum loss, one CCE per PDCCH candidate, considering both PDCCH candidates. If instead, two CCEs on the right-side, CCEs 6, 7, were skipped, two CCEs of candidate 2 will be lost which significantly impacts the PDCCH decoding performance for this candidate.

Figure 10:
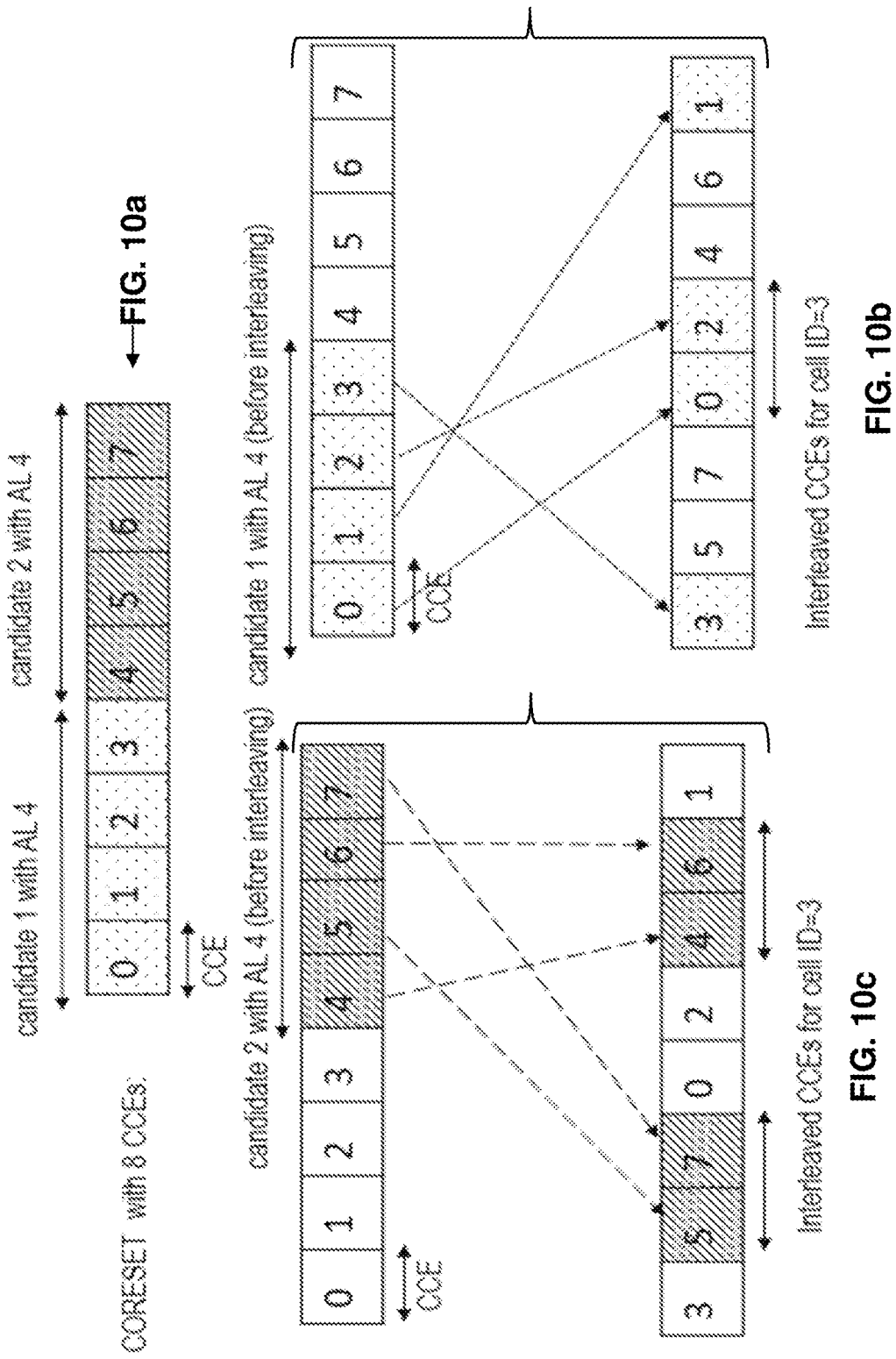
FIGS. 10a-c are schematic block diagrams illustrating embodiments herein.

FIGS. 10a, 10b and 10c show another example. In this example, the positions of interleaved CCEs for each PDCCH candidate relate to another cell-ID, cell ID=3 in a CORESET. It should be noted that the cell-ID impacts the interleaving pattern in the CCE-REG mapping and thus also the determining 302 of which CCEs to skip. The cell-ID is impacting the interleaving pattern since the locations of REGs, and CCEs, in the CORESET depend on the cell-ID as described in the background section (CCE-REG mapping).

FIG. 10a illustrates a CORESET of 8 CCEs comprising a first PDCCH candidate 1 with AL4 comprising CCEs 0, 1, 2, 3 which are marked with dotted boxes, and the second PDCCH candidate 2 with AL4 comprising CCEs 4, 6, 5, 7 which are marked with diagonally striped boxes. FIG. 10a depicts the CORESET before the interleaving.

The CCEs 0, 1, 2, 3 4, 6, 5, 7 in the CORESET are then interleaved.

FIG. 10b illustrates the CCE positions before and after the interleaving. FIG. 10b focuses on the first PDCCH candidate 1 with AL4 comprising the CCEs 0, 1, 2, 3 which are marked with dotted boxes. The other boxes comprising the second candidate CCEs 4, 5, 6, 7 have no texture. Here the CCE positions are different compared to the example in FIG. 8b.

FIG. 10c illustrates the same CCE positions before and after the interleaving. But FIG. 10c focuses on the second PDCCH candidate 2 with AL4 comprising the CCEs 4, 5, 6, 7 which are marked with diagonally striped boxes. The other boxes comprising the first candidate CCEs 0, 1, 2, 3 have no texture. Also here, the CCE positions are different compared to the example in FIG. 8c.

Figure 11:
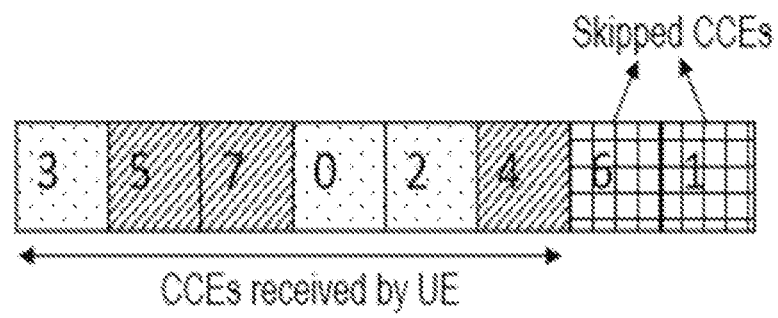
FIG. 11 is a schematic block diagram illustrating embodiments herein.

FIG. 11 illustrates an efficient approach for receiving a portion of CORESET for cell-ID=3. According to embodiments herein, in this example the UE 120 determines to skip CCEs 6 and 1 which are marked with checked boxes, as shown in FIG. 11. Then the the bandwidth of the CORESET is equal or smaller than the bandwidth of the UE 120, and the UE 120 is capable to receive the CORESET. In this case, the UE 120 can receive 3 CCEs of each PDCCH candidate with AL 4. This ensures the minimum loss (one CCE per candidate) considering both PDCCH candidates.

As shown in FIG. 11, the UE receives 3 CCEs of each PDCCH candidate with AL 4, the CCEs 0, 2, 3 of the first PDCCH candidate 1, which are marked with dotted boxes, and CCEs 4, 5, 7 of the second PDCCH candidate 2, which are marked with diagonally striped boxes. This ensures the minimum loss, one CCE per PDCCH candidate, considering both PDCCH candidates.

If instead, one CCE on the right-side and one CCE on the left-side, CCEs 3, and 1, were skipped, two CCEs of candidate 1 will be lost which significantly impacts the PDCCH decoding performance for this candidate.

As has been seen above, the positions of CCEs in an interleaved CORESET depend on the cell-ID. For the example of a COREST being the CORESET #0, based on the interleaving parameters, the following aspects may be envisioned:

The received resource pattern may be the same for UEs with the same BW that are configured with the same CORESET #0 parameters with the same $(n_{ID})$ mod $(N_{cce})$ value, where $n_{ID}$ is the cell-ID, $N_{cce}$ is the number of CCEs within the CORESET, and mod is modulo operation.

In some special examples of embodiments herein, if the UE 120 bandwidth is smaller than the size of the CORESET, e.g. CORESET #0, the following aspects may be considered:

The UE 120 may position its limited bandwidth such that the starting RB aligns with, i.e. is the same as, the starting RB of the CORESET, e.g. CORESET #0.

The UE 120 may position its limited bandwidth such that the ending RB aligns with, is the same as, the ending RB of the CORESET, e.g. CORESET #0.

Figure 12:
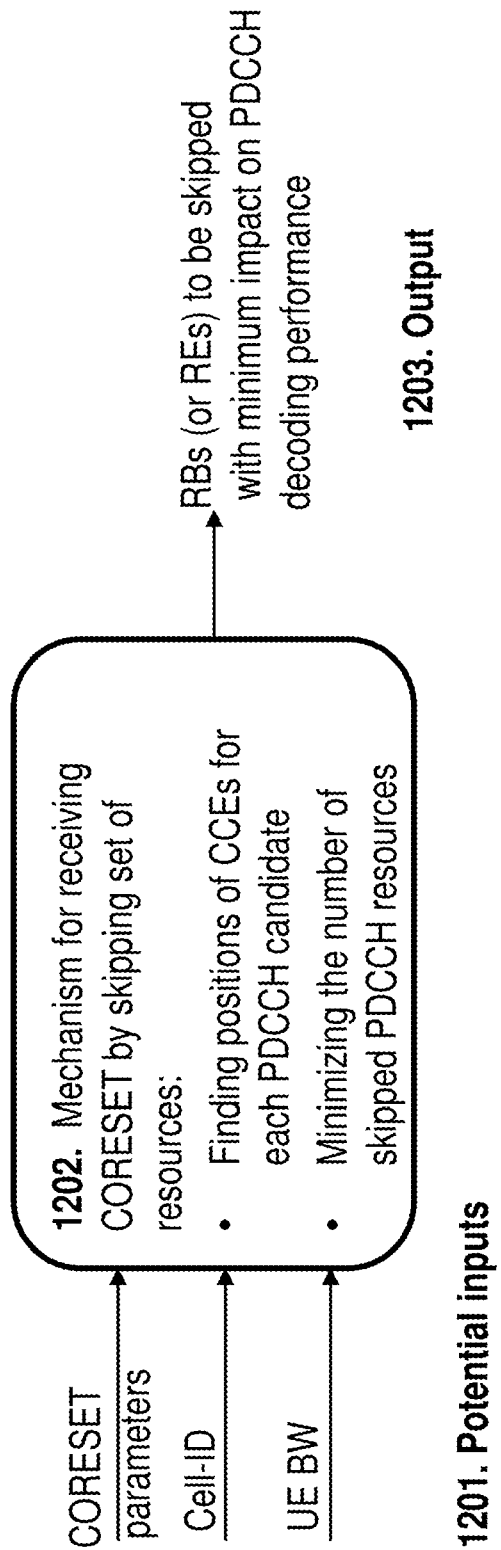
FIG. 12 is a schematic block diagram illustrating embodiments herein.

A non-limiting example of the procedure according to some embodiments herein is shown in FIG. 12. In summary, the UE 120 may take various inputs 1201 such as UE BW, CORESET parameters, and cell-ID to determine 402 which part of the CORESET to skip, to be able to receive the rest of the CORESET comprising the best set of CORESET RBs and/or REs which will be received at the reduced BW UE 120, e.g. at its receiver.

In some embodiments, the method for receiving 1202 the CORESET by skipping a part comprising a set of resources is e.g. performed by finding positions of CCEs for each PDCCH candidate and minimizing the number of skipped PDCCH resources.

The output 1203 may comprise RBs or REs to be skipped with minimum impact on PDCCH decoding performance.

For the bandwidth limited UE 120, some part of transmitted PDCCH candidate in the CORESET, e.g. CORESET #0, is determined to be skipped and thus not be received. From the UE 120 perspective, this part may be considered as punctured and may correspond to some punctured bit positions of the output of a rate matching for polar code. This means that the bits have zero values.

The bandwidth limited UE 120 may perform insertion of zeros as soft values, Log-likelihood ratio (LLR) values before sending the LLRs to a polar decoder, for both the corresponding positions of the bits punctured at the output of the polar encoder, for rate matching, and the corresponding positions that the UE 120 determined to skip receiving.

In addition, the insertion of zero soft-bit values may be performed in all the positions corresponding to the punctured parts of a PDCCH candidate, the parts that are not received by the UE 120.

Or, the insertion of zero soft-bit values may be performed in some positions of the punctured parts of a PDCCH candidate, the parts that are not received by the UE 120.

Some Second Embodiments Relating to Efficient Scheduling of Control Channels by Network While the UE 120 implements efficient decoding mechanisms based on the positions of PDCCH candidates within the CORESET, the network node 110 may also properly schedule PDCCH candidates based on the BW position and the BW of the UE 120. E.g., the network node 110 may schedule PDCCH candidates based on the position and BW of the UE such that the potential impact at the receiver is minimized.

Furthermore, the network node 110 may send assistant information to the UE to indicate a preferred starting RB position for the UE. This information may e.g. be provided in the system information, and it may be based on the AL.

Some Third Embodiments Relating to Multi-Stage Monitoring of Control Channel

This relates to and may be combined with Action 404 described above.

In some other embodiment, the UE 120 may measure CORESET#0 in different REs at different time and then combine the measurement results for jointly decoding, the measured REs at different time may be overlapped, partially overlapped or non-overlapped. A measurement gap to support this measurement may be pre-defined or configured at the network node 110 and UE 120 sides for this kind of bandwidth limited UEs. The UE 120 may indicate its capability to support this measurement to the network node 110. The UE 120 may indicate its capability of needed measurement gap to the network node 110. The network node 110 may also configure the information of measurement gap to the UE 120 so that the network and the UE can have aligned information for this.

In some embodiments, the UE 120 monitors different parts of the CORESET in different time instances. For example, the UE 120 may change the skipped subcarriers of CORESET every T ms, so that the skipped portions of the CORESET in some or all of the subframes are non-overlapping or partially overlapping. Note that this may require retuning of the UE's 120 center frequency in certain subframes to receive different portions of the CORESET. In these embodiments, the transmission gap may be needed to support frequency hopping, so the network node 110 may need to know whether the UE 120 supports wider bandwidth or frequency hopping for the CORESET reception. In this case, a UE 120 capability report may be needed. The UE 120 may report its capability of frequency hopping for CORESET reception to the network node 110. The transmission gap to support frequency hopping may be needed.

In a sub-embodiment, the UE 120 may perform frequency retuning, (RF retuning) to monitor different parts of the CORESET in multiple stages. For example, in the first stage lower part of CORESET is monitored and in later stages higher part of CORESET will be monitored. Moreover, some parts of CORESET may be monitored and/or decoded multiple times to improve the detection performance. The UE 120 may also determine to skip a portion of the CORESET to minimize the required RF retuning.

Figure 13:
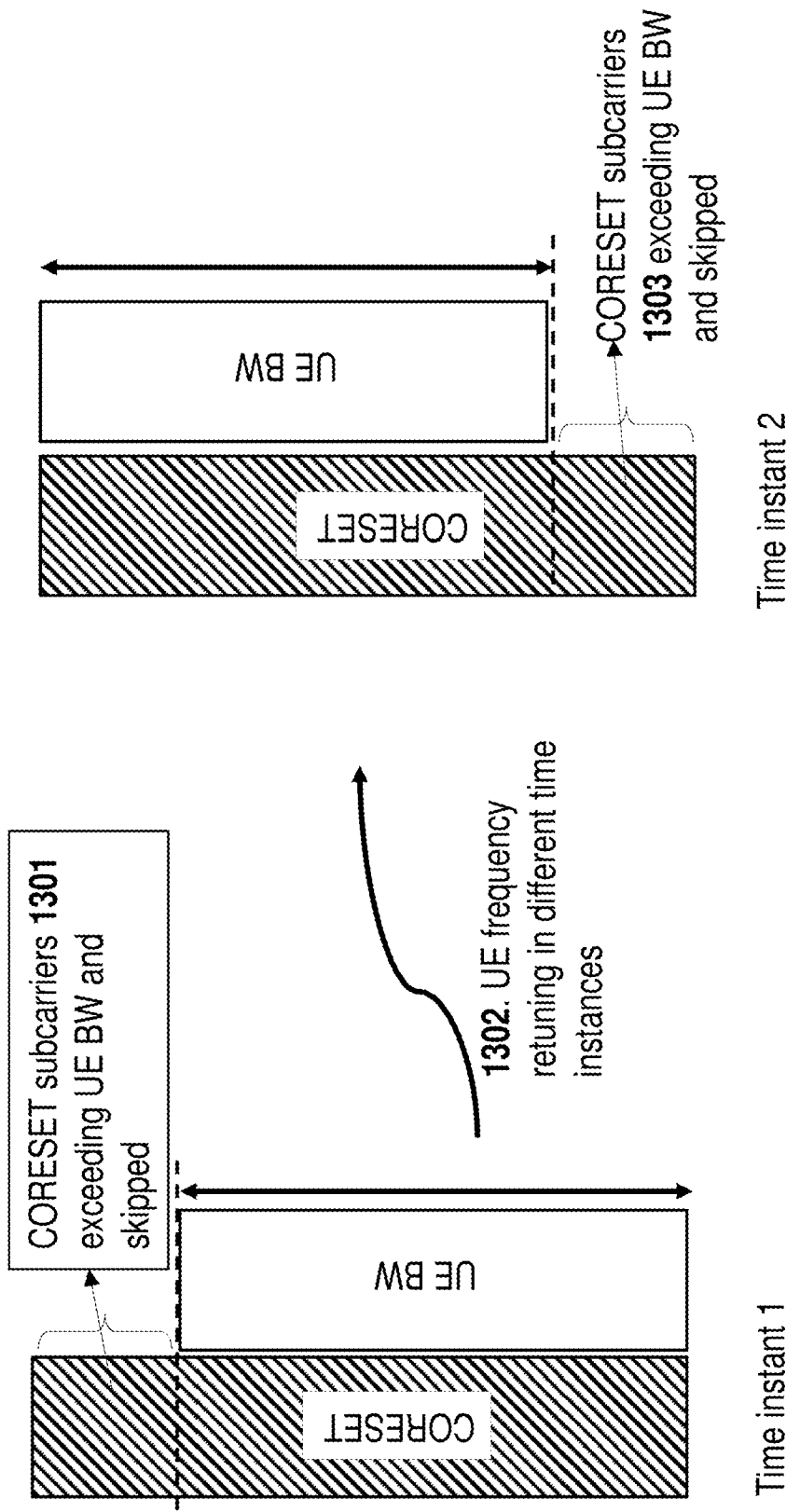
FIG. 13 is a schematic block diagram illustrating embodiments herein.

FIG. 13 illustrates a UE 120 frequency retuning for monitoring different parts of control channel in different time instances.

At a Time instant 1 the UE 120 has determined to skip CORESET subcarriers 1301 exceeding UE BW at the higher end of the BW.

In these embodiments, the UE 120 retunes 1302 frequency retuning in different time instances. At a subsequent Time instant 2, the UE 120 has determined to skip CORESET subcarriers 1303 exceeding UE BW at the lower end of the BW.

It should be noted that embodiments described herein may be applied to any CORESET including CORESET #0.

To perform the method actions above, the UE 120 is configured to handle a CORESET from the network node 110 in the wireless communications network 100. The UE 120 is adapted to operate with a reduced bandwidth. The UE 120 may comprise an arrangement depicted in FIGS. 14*a* and 14*b*.

The UE 120 may comprise an input and output interface 1400 configured to communicate in the communication network 100, e.g. with the network node 110. The input and output interface 1400 may comprise a wireless receiver (not shown) and a wireless transmitter (not shown).

The UE 120 may further be configured to, e.g. by means of a detecting unit 1401 in the UE 120, detect a CORESET from the network node 110, and that a bandwidth of the CORESET is larger than the bandwidth of the UE 120, wherein PDCCH candidates are adapted to be transmitted in the CORESET.

The UE 120 may further be configured to, e.g. by means of a determining unit 1402 in the UE 120, determine which part of the CORESET to skip, to make the bandwidth of the CORESET equal or smaller than the bandwidth of the UE 120, such that the UE 120 is capable to receive the CORESET. The part of the CORESET to be skipped is adapted to be determined based on a predicted decoding performance of the PDCCH candidates in the CORESET.

The UE 120 may further be configured to, e.g. by means of the determining unit 1402 in the UE 120, determine which part of the CORESET to be skipped such that the predicted decoding performance of the PDCCH candidates in the CORESET achieves a performance that is any one out of:
  above a first threshold,
  as high as possible above the first threshold, or
  such that an impact on the decoding is minimized,
  such that a worst case impact is minimized or
  such that an average impact is minimized.

The UE 120 may further be configured to, e.g. by means of the determining unit 1402 in the UE 120, determine which part of the CORESET to be skipped based on any one or more out of:
  parameters related to the CORESET,
  the positions of all PDCCH candidates comprised in the CORESET
  the position of a PDCCH candidate which is most affected by being skipped, the position of Control Channel Elements, CCEs, used for the PDCCH candidates which are most affected by being skipped, and whether or not the CORESET is interleaved.

The UE 120 may further be configured to, e.g. by means of the determining unit 1402 in the UE 120, determine which part of the CORESET to be skipped by: determining which part or parts of the CORESET to be skipped, and wherein the part or parts of the CORESET to be skipped is/are adapted to comprise any one out of:

the first K Resource Blocks, RBs, of the CORESET,
the last K RBs of the CORESET,
the first $K_L$ RBs and the last $K_R$ RBs of the CORESET,
the first q subcarriers of the CORESET,
the last q subcarriers of the CORESET, and
the first $q_L$ subcarriers and the last $q_R$ subcarriers of the CORESET.

The UE 120 may further be configured to, e.g. by means of a sending unit 1403 in the UE 120, send a message to the network node 110, which message is adapted to indicate the part or parts of the CORESET that are determined to be skipped in order to make the bandwidth of the CORESET equal or smaller than the bandwidth of the UE 120, such that the UE 120 is capable to receive the CORESET.

In some embodiments, subsequent CORESET from the network node 110 are adapted to be detected in a periodicity comprising a time interval. The UE 120 may further be configured to, e.g. by means of a changing unit 1404 in the UE 120, change the skipped part or parts of the subsequent CORESET within the time interval, so that the skipped part or parts of the CORESET in some or all of the subframes are non-overlapping or partially overlapping.

The UE 120 may further be configured to, e.g. by means of a receiving unit 1405 in the UE 120, receive the CORESET in which the determined part or parts are skipped.

In some embodiments, the UE 120 is further configured to, e.g. by means of a receiving unit 1405 in the UE 120, when receiving the CORESET in which the determined part or parts are skipped, position the limited bandwidth of the UE (120) according to any one out of:

such that a starting RB aligns with the starting RB of the CORESET, or
such that the ending RB aligns with the ending RB of the CORESET.

In embodiments, the decoding performance of the PDCCH candidates in the CORESET is adapted to be predicted based on any one or more out of:

an error probability of the decoding, parameters and configuration related to the CORESET, battery life of the UE 120, UE 120 performance requirements, UE 120 centre frequency position, carrier bandwidth, and UE 120 capabilities, UE 120 bandwidth.

In some embodiments, the parts of the CORESET to be skipped are adapted to comprise the first $q_L$ subcarriers and the last $q_R$ subcarriers of the CORESET, wherein:

one half of the subcarriers to be skipped are adapted to be comprised in the first $q_L$ subcarriers, and
the other half of the subcarriers to be skipped are adapted to be comprised in the last $q_R$ subcarriers of the CORESET.

In some embodiments, the parts of the CORESET to be skipped are adapted to comprise the first $K_L$ RBs and the last $K_R$ RBs of the CORESET, and wherein:

one half of the RBs to be skipped are adapted to be comprised in the first $K_L$ RBs, and
the other half of the RBs to be skipped are adapted to be comprised the last $K_R$ RBs of the CORESET.

Figure 14A:
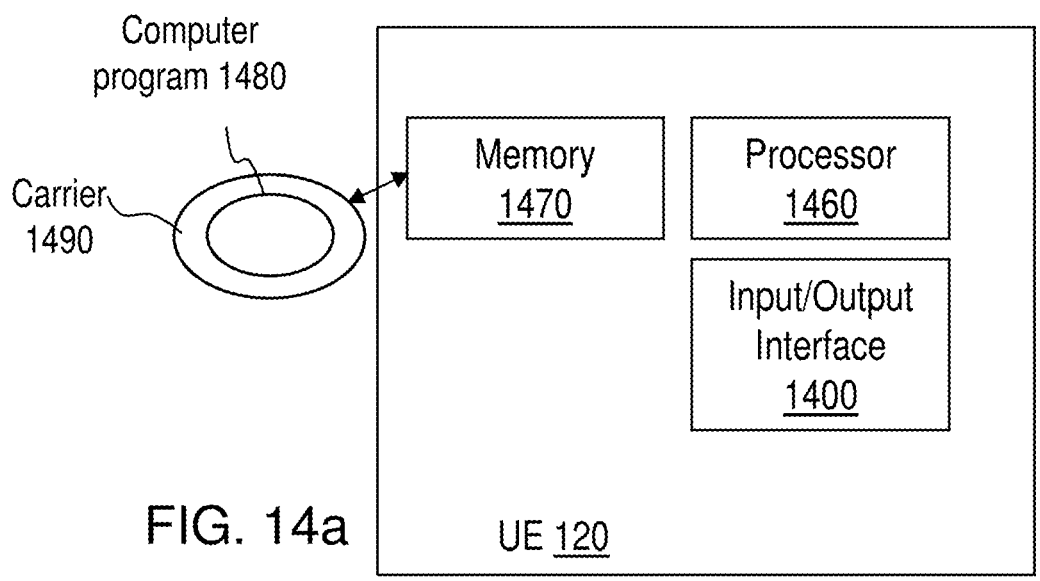
FIGS. 14a-b are schematic block diagrams illustrating embodiments of a UE.
Figure 14B:
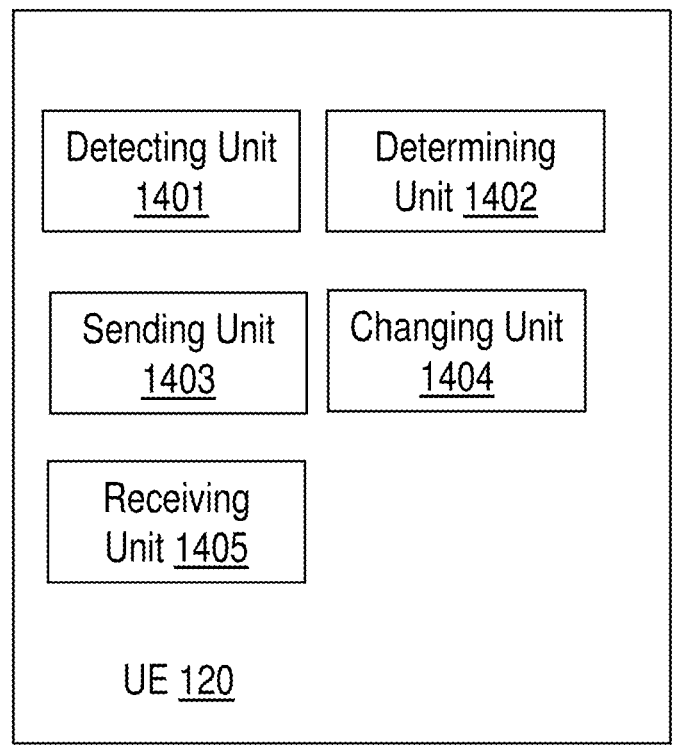

The embodiments herein may be implemented through a respective processor or one or more processors, such as the processor 1460 of a processing circuitry in the UE 120 depicted in FIG. 14*a*, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1470 comprising one or more memory units. The memory 1470 comprises instructions executable by the processor in UE 120. The memory 1470 is arranged to be used to store e.g., information, indications, data, configurations, and applications to perform the methods herein when being executed in the UE 120.

In some embodiments, a computer program 1480 comprises instructions, which when executed by the respective at least one processor 1460, cause the at least one processor of the UE 120 to perform the actions above.

In some embodiments, a respective carrier 1490 comprises the respective computer program 1480, wherein the carrier 1490 is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

To perform the method actions above, the network node 110 is configured to handle CORESETs in the wireless communications network 100. The network node 110 may comprise an arrangement depicted in FIGS. 15*a* and 15*b*.

The network node 110 may comprise an input and output interface 1500 configured to communicate in the communication network 100, e.g. with the UE 120. The input and output interface 1500 may comprise a wireless receiver (not shown) and a wireless transmitter (not shown).

The network node 110 may further be configured to, e.g. by means of a sending unit 1501 in the network node 110, send a CORESET to the UE 120. The UE 120 is adapted to operate with a reduced bandwidth.

The network node 110 may further be configured to, e.g. by means of a receiving unit 1502 in the network node 110, when a bandwidth of the CORESET is larger than the bandwidth of the UE 120, receive a message from the UE 120, which message is adapted to indicate a part or parts of the CORESET that are determined to be skipped in order to make the bandwidth of the CORESET equal or smaller than the bandwidth of the UE 120, such that the UE 120 is capable to receive the CORESET.

The network node 110 may further be configured to, e.g. by means of a scheduling unit 1503 in the network node 110, schedule PDCCH candidates in a second CORESET, based on the indicated part or parts of the CORESET that are determined to be skipped, a bandwidth of a second UE 122, a position of said bandwidth, and a predicted decoding performance of the PDCCH candidates at a receiver of the second UE 122, such that the bandwidth of the second CORESET is equal or smaller than a bandwidth of the second UE 122 operating with a reduced bandwidth.

The network node 110 may further be configured to, e.g. by means of the sending unit 1501 in the network node 110, send the second CORESET to the second UE 122 as scheduled.

In some embodiments, the part or parts of the CORESET to be skipped is/are adapted to comprise any one out of:
the first K Resource Blocks, RBs, of the CORESET,
the last K RBs of the CORESET,
the first $K_L$ RBs and the last $K_R$ RBs of the CORESET,
the first q subcarriers of the CORESET,
the last q subcarriers of the CORESET, and
the first $q_L$ subcarriers and the last $q_R$ subcarriers of the CORESET.

In some embodiments, the parts of the CORESET to be skipped are adapted to comprise the first $q_L$ subcarriers and the last $q_R$ subcarriers of the CORESET, wherein:
one half of the subcarriers to be skipped are adapted to be comprised in the first $q_L$ subcarriers, and
the other half of the subcarriers to be skipped are adapted to be comprised in the last $q_R$ subcarriers of the CORESET.

In some embodiments, the parts of the CORESET to be skipped are adapted to comprise the first $K_L$ RBs and the last $K_R$ RBs of the CORESET, wherein:
one half of the RBs to be skipped are adapted to be comprised in the first $K_L$ RBs, and
the other half of the RBs to be skipped adapted to be comprised the last $K_R$ RBs of the CORESET.

Figure 15A:
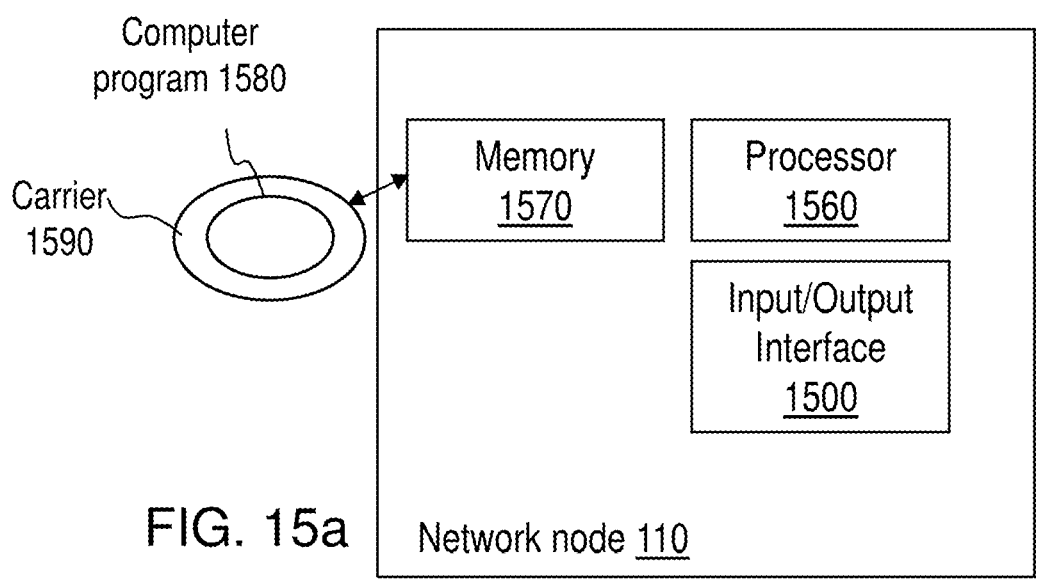
FIGS. 15a-b are schematic block diagrams illustrating embodiments of a network node.
Figure 15B:
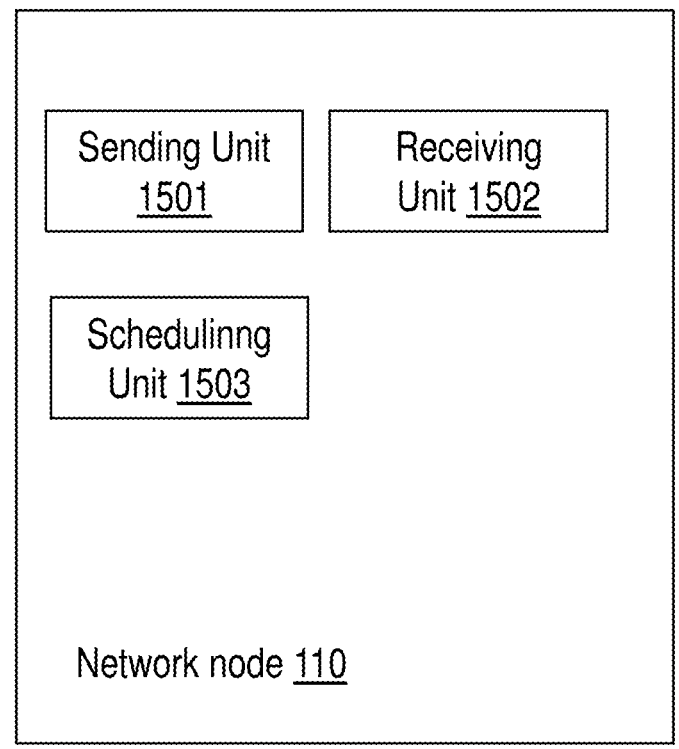

The embodiments herein may be implemented through a respective processor or one or more processors, such as the processor 1560 of a processing circuitry in the network node 110 depicted in FIG. 15*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1570 comprising one or more memory units. The memory 1570 comprises instructions executable by the processor in network node 110. The memory 1570 is arranged to be used to store e.g. information, indications, data, configurations, and applications to perform the methods herein when being executed in the network node 110.

In some embodiments, a computer program 1580 comprises instructions, which when executed by the respective at least one processor 1560, cause the at least one processor of the network node 110 to perform the actions above.

In some embodiments, a respective carrier 1590 comprises the respective computer program 1580, wherein the carrier 1590 is one of an electronic signal, an optical signal, an electromagnetic signal, a magnetic signal, an electric signal, a radio signal, a microwave signal, or a computer-readable storage medium.

Those skilled in the art will appreciate that the units in the network node 110 described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

Figure 16:
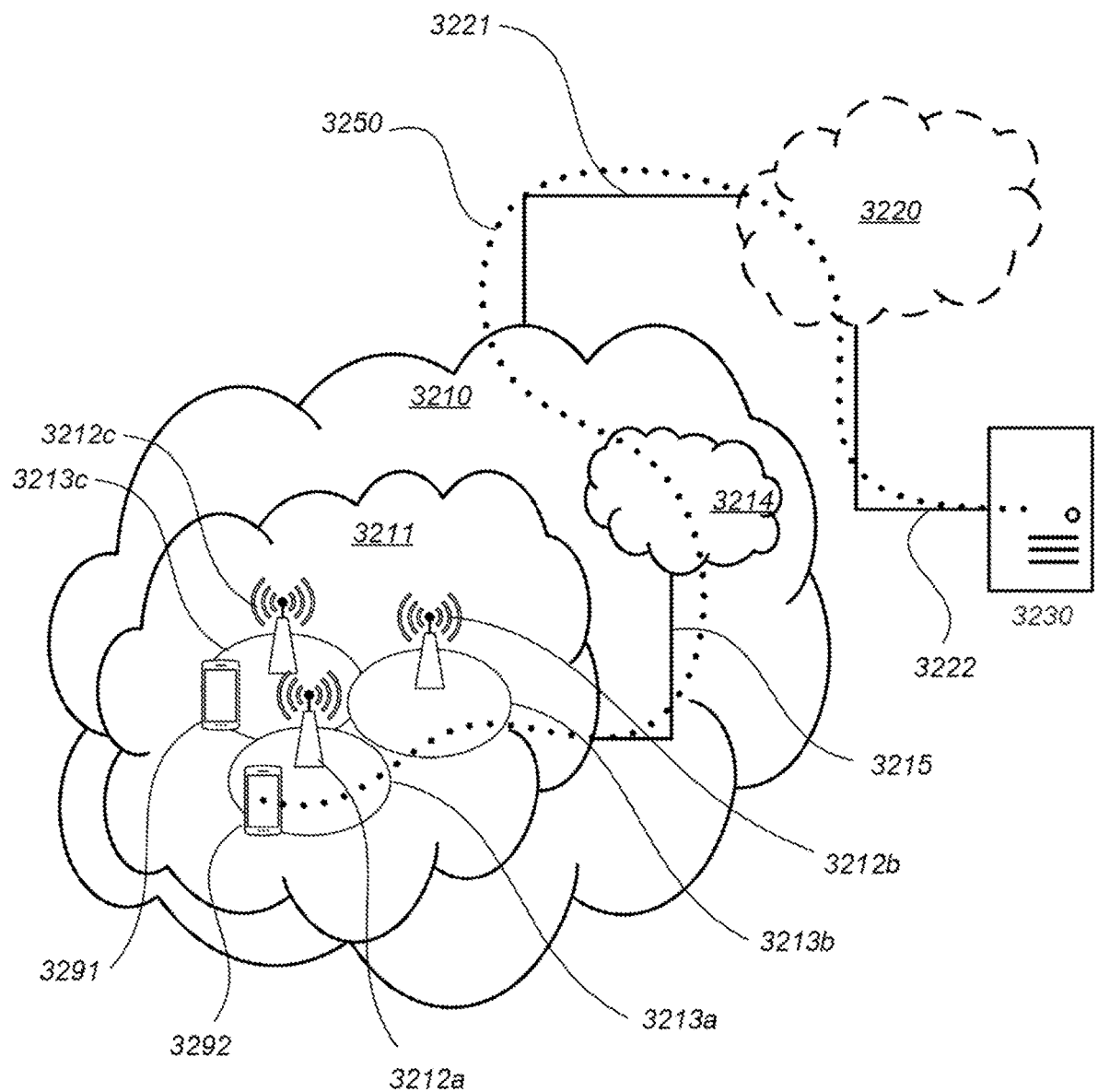
FIG. 16 schematically illustrates a telecommunication network connected via an intermediate network to a host computer.

With reference to FIG. 16, in accordance with an embodiment, a communication system includes a telecommunication network 3210, such as a 3GPP-type cellular network, e.g. the wireless communication network 100, which comprises an access network 3211, such as a radio access network, and a core network 3214. The access network 3211 comprises a plurality of base stations 3212*a*, 3212*b*, 3212*c*, such as AP STAs NBs, eNBs, gNBs or other types of wireless access points, each defining a corresponding coverage area 3213*a*, 3213*b*, 3213*c*. Each base station 3212*a*, 3212*b*, 3212*c*, e.g. the network nodes 110, is connectable to the core network 3214 over a wired or wireless connection 3215. A first user equipment (UE), e.g. the UE 120, such as a Non-AP STA 3291 located in coverage area 3213*c* is configured to wirelessly connect to, or be paged by, the corresponding base station 3212*c*. A second UE 3292 such as a Non-AP STA in coverage area 3213*a*, e.g. the second UE 122, is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 17 may be identical to the host computer 3230, one of the base stations 3212a, 3212b, 3212c and one of the UEs 3291, 3292 of FIG. 16, respectively. This is to say, the inner workings of these entities may be as shown in FIG. 17 and independently, the surrounding network topology may be that of FIG. 16.

Figure 17:
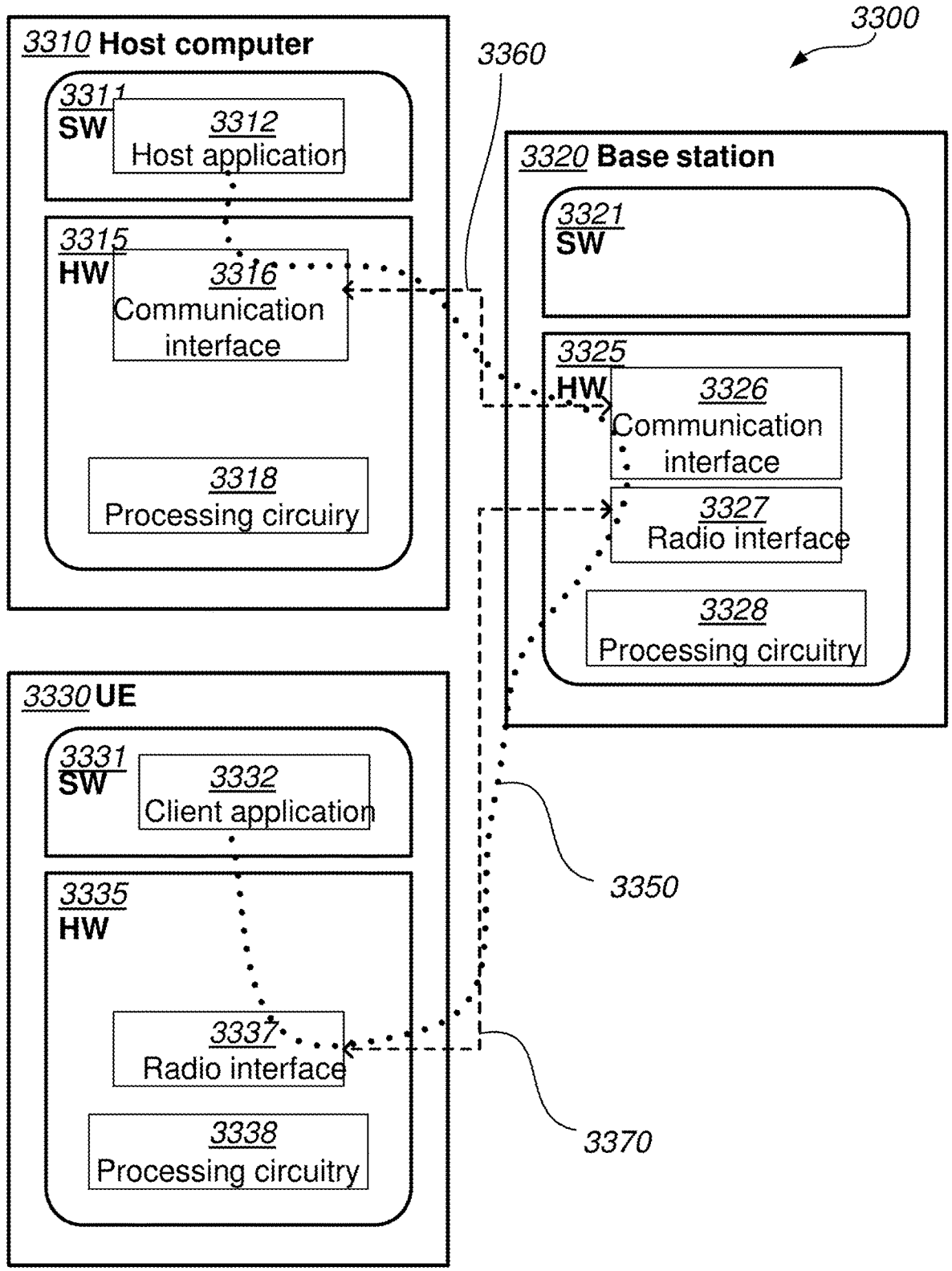
FIG. 17 is a generalized block diagram of a host computer communicating via a base station with a user equipment over a partially wireless connection.

In FIG. 17, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the RAN effect: data rate, latency, power consumption and thereby provide benefits such as e.g. the applicable corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 18 is a flowchart illustrating a method implemented in a communication system, in accordance with one embodiment. The communication system includes a host computer, a base station such as an AP STA, and a UE such as a Non-AP STA which may be those described with reference to FIG. 16 and FIG. 17. For simplicity of the present disclosure, only drawing references to FIG. 18 will be included in this section. In a first step 3410 of the method, the host computer provides user data. In an optional sub step 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 19 is a flowchart illustrating a method implemented in a communication system, in accordance with one embodiment. The communication system includes a host computer, a base station such as an AP STA, and a UE such as a Non-AP STA which may be those described with reference FIG. 16 and FIG. 17. For simplicity of the present disclosure, only drawing references to FIG. 19 will be included in this section. In a first step 3510 of the method, the host computer provides user data. In an optional sub step (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 20 is a flowchart illustrating a method implemented in a communication system, in accordance with one embodiment. The communication system includes a host computer, a base station such as an AP STA, and a UE such as a Non-AP STA which may be those described with reference to FIG. 16 and FIG. 17. For simplicity of the present disclosure, only drawing references to FIG. 20 will be included in this section. In an optional first step 3610 of the method, the UE receives input data provided by the host computer. Additionally or alternatively, in an optional second step 3620, the UE provides user data. In an optional sub step 3621 of the second step 3620, the UE provides the user data by executing a client application. In a further optional sub step 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub step 3630, transmission of the user data to the host computer. In a fourth step 3640 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station such as an AP STA, and a UE such as a Non-AP STA which may be those described with reference to FIG. 16 and FIG. 17. For simplicity of the present disclosure, only drawing references to FIG. 21 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the preferred embodiments described above. Various alternatives, modifications and equivalents may be used.

ABBREVIATION EXPLANATION

BW Bandwidth
BWP Bandwidth Part
CORESET Control Resource Set
CSS Common Search Space
DCI Downlink Control Information
Msg2 Message 2 during random access
NR New Radio
NR-RedCap Reduced Capability NR Devices
PDCCH Physical Downlink Control Channel
PUCCH Physical Uplink Control Channel
PUSCH Physical Uplink Shared Channel
RE Resource Element
REG Resource Element Group
RF Radio Frequency
RACH Random Access Channel
PRACH Physical Random Access Channel
PRB Physical Resource Block
RAR Random Access Response
SCS Subcarrier Spacing
SSB Synchronization Signal Block
UE User equipment

The invention claimed is:

1. A method performed by a User Equipment, UE, for handling a Control Resource Set, CORESET, from a network node in a wireless communications network, which UE operates with a reduced bandwidth, the method comprising:
    detecting a CORESET from the network node, and that a bandwidth of the CORESET is larger than the bandwidth of the UE, Physical Downlink Control Channel, PDCCH, candidates being transmitted in the CORESET;
    determining which part of the CORESET to skip, to make the bandwidth of the CORESET equal or smaller than the bandwidth of the UE, such that the UE is capable of receiving the CORESET; and
    the part of the CORESET to be skipped being determined based on a predicted decoding performance of the PDCCH candidates in the CORESET.

2. The method according to claim 1, wherein the determining of which part of the CORESET to be skipped is performed such that the predicted decoding performance of the PDCCH candidates in the CORESET achieves a performance that is any one out of:
- above a first threshold;
- as high as possible above the first threshold;
- such that an impact on the decoding is minimized;
- such that a worst case impact is minimized; and
- such that an average impact is minimized.

3. The method according to claim 1, wherein the decoding performance of the PDCCH candidates in the CORESET is predicted based on any one or more out of:
- an error probability of the decoding;
- parameters and configuration related to the CORESET;
- battery life of the UE;
- UE performance requirements;
- UE centre frequency position;
- carrier bandwidth;
- UE capabilities; and
- UE bandwidth.

4. The method according to claim 1, wherein the determining of which part of the CORESET to be skipped further is based on any one or more out of:
- parameters related to the CORESET;
- the positions of all PDCCH candidates comprised in the CORESET;
- the position of a PDCCH candidate which is most affected by being skipped;
- the position of Control Channel Elements, CCEs, used for the PDCCH candidates which are most affected by being skipped; and
- whether or not the CORESET is interleaved.

5. The method according to claim 1, wherein the determining of which part of the CORESET to be skipped comprises:
- determining which part or parts of the CORESET to be skipped, and wherein the part or parts of the CORESET to be skipped comprises any one out of:
- the first K Resource Blocks, RBs, of the CORESET;
- the last K RBs of the CORESET;
- the first $K_L$ RBs and the last KR RBs of the CORESET;
- the first q subcarriers of the CORESET;
- the last q subcarriers of the CORESET; and
- the first $q_L$ subcarriers and the last $q_R$ subcarriers of the CORESET.

6. The method according to claim 5, wherein the parts of the CORESET to be skipped comprises the first $q_L$ subcarriers and the last $q_R$ subcarriers of the CORESET, wherein:
- one half of the subcarriers to be skipped are comprised in the first $q_L$ subcarriers; and
- the other half of the subcarriers to be skipped are comprised in the last $q_R$ subcarriers of the CORESET.

7. The method according to claim 5, wherein the parts of the CORESET to be skipped comprises the first $K_L$ RBs and the last $K_R$ RBs of the CORESET, wherein:
- one half of the RBs to be skipped are comprised in the first $K_L$ RBs; and
- the other half of the RBs to be skipped are comprised the last $K_R$ RBs of the CORESET.

8. The method according to claim 1, further comprising:
- sending a message to the network node, which message indicates the part or parts of the CORESET that are determined to be skipped in order to make the bandwidth of the CORESET equal or smaller than the bandwidth of the UE, such that the UE is capable of receiving the CORESET.

9. The method according to claim 1, wherein subsequent CORESET from the network node are detected in a periodicity comprising a time interval, the method further comprising:
- changing the skipped part or parts of the subsequent CORESET within the time interval, so that the skipped part or parts of the CORESET in some or all of the subframes are non-overlapping or partially overlapping.

10. The method according to claim 1, further comprising:
- receiving the CORESET in which the determined part or parts are skipped.

11. The method according to claim 10, wherein, when receiving the CORESET in which the determined part or parts are skipped, position the limited bandwidth of the UE according to any one out of:
- such that a starting RB aligns with the starting RB of the CORESET; or
- such that the ending RB aligns with the ending RB of the CORESET.

12. The UE according to claim 10, further configured to:
- when receiving the CORESET in which the determined part or parts are skipped, position the limited bandwidth of the UE (120) according to any one out of:
- such that a starting RB aligns with the starting RB of the CORESET; or
- such that the ending RB aligns with the ending RB of the CORESET.

13. A method performed by a network node for handling Control Resource Sets, CORESETs, in a wireless communications network, the method comprising:
- sending a CORESET to a User Equipment, UE, which UE operates with a reduced bandwidth;
- when a bandwidth of the CORESET is larger than the bandwidth of the UE, receiving a message from the UE, which message indicates a part or parts of the CORESET that are determined to be skipped in order to make the bandwidth of the CORESET equal or smaller than the bandwidth of the UE, such that the UE is capable of receiving the CORESET;
- scheduling Physical Downlink Control Channel, PDCCH, candidates in a second CORESET, based on the indicated part or parts of the CORESET that are determined to be skipped, a bandwidth of a second UE, a position of the bandwidth, and a predicted decoding performance of the PDCCH candidates at the receiver of the second UE, such that the bandwidth of the second CORESET is equal or smaller than a bandwidth of the second UE operating with a reduced bandwidth; and
- sending the second CORESET to the second UE as scheduled.

14. The method according to claim 13, wherein the part or parts of the CORESET to be skipped comprises any one out of:
- the first K Resource Blocks, RBs, of the CORESET;
- the last K RBs of the CORESET;
- the first $K_L$ RBs and the last $K_R$ RBs of the CORESET;
- the first q subcarriers of the CORESET;
- the last q subcarriers of the CORESET; and
- the first $q_L$ subcarriers and the last $q_R$ subcarriers of the CORESET.

15. The method according to claim 14, wherein the parts of the CORESET to be skipped comprises the first $q_L$ subcarriers and the last $q_R$ subcarriers of the CORESET, wherein:
- one half of the subcarriers to be skipped are comprised in the first $q_L$ subcarriers; and the other half of the subcarriers to be skipped are comprised in the last $q_R$ subcarriers of the CORESET.

16. The method according to claim 15, wherein the parts of the CORESET to be skipped comprises the first $K_L$ RBs and the last $K_R$ RBs of the CORESET, wherein:
one half of the RBs to be skipped are comprised in the first $K_L$ RBs; and
the other half of the RBs to be skipped are comprised the last $K_R$ RBs of the CORESET.

17. A User Equipment, UE, configured to handle a Control Resource Set, CORESET, from a network node in a wireless communications network, which UE is configured to operate with a reduced bandwidth, the UE further being configured to:
detect a CORESET from the network node, and that a bandwidth of the CORESET is larger than the bandwidth of the UE, wherein Physical Downlink Control Channel, PDCCH, candidates being configured to be transmitted in the CORESET;
determine which part of the CORESET to skip, to make the bandwidth of the CORESET equal or smaller than the bandwidth of the UE, such that the UE is capable of receiving the CORESET; and
the part of the CORESET to be skipped being determined based on a predicted decoding performance of the PDCCH candidates in the CORESET.

18. The UE according to claim 17, further configured to determine which part of the CORESET to be skipped such that the predicted decoding performance of the PDCCH candidates in the CORESET achieves a performance that is any one out of:
above a first threshold;
as high as possible above the first threshold;
such that an impact on the decoding is minimized;
such that a worst case impact is minimized; and
such that an average impact is minimized.

19. The UE according to claim 17, wherein the decoding performance of the PDCCH candidates in the CORESET is adapted to be predicted based on any one or more out of:
an error probability of the decoding;
parameters and configuration related to the CORESET;
battery life of the UE;
UE performance requirements;
UE centre frequency position;
carrier bandwidth;
UE capabilities; and
UE bandwidth.

20. The UE according to claim 17 further configured to determine which part of the CORESET to be skipped based on any one or more out of:
parameters related to the CORESET;
the positions of all PDCCH candidates comprised in the CORESET;
the position of a PDCCH candidate which is most affected by being skipped;
the position of Control Channel Elements, CCEs, used for the PDCCH candidates which are most affected by being skipped; and
whether or not the CORESET is interleaved.

21. The UE according to claim 17, further configured to determine which part of the CORESET to be skipped by:
determining which part or parts of the CORESET to be skipped, and wherein the part or parts of the CORESET to be skipped is/are adapted to comprise any one out of:
the first K Resource Blocks, RBs, of the CORESET;
the last K RBs of the CORESET;
the first $K_L$ RBs and the last $K_R$ RBs of the CORESET;
the first q subcarriers of the CORESET;
the last q subcarriers of the CORESET; and
the first $q_L$ subcarriers and the last $q_R$ subcarriers of the CORESET.

22. The UE according to claim 21, wherein the parts of the CORESET to be skipped are adapted to comprise the first $q_L$ subcarriers and the last $q_R$ subcarriers of the CORESET, wherein:
one half of the subcarriers to be skipped are adapted to be comprised in the first $q_L$ subcarriers; and
the other half of the subcarriers to be skipped are adapted to be comprised in the last qR subcarriers of the CORESET.

23. The UE according to claim 21, wherein the parts of the CORESET to be skipped are adapted to comprise the first $K_L$ RBs and the last $K_R$ RBs of the CORESET, and wherein:
one half of the RBs to be skipped are adapted to be comprised in the first $K_L$ RBs; and
the other half of the RBs to be skipped are adapted to be comprised the last $K_R$ RBs of the CORESET.

24. The UE according to claim 17, further configured to:
send a message to the network node, which message is adapted to indicate the part or parts of the CORESET that are determined to be skipped in order to make the bandwidth of the CORESET equal or smaller than the bandwidth of the UE, such that the UE is capable of receiving the CORESET.

25. The UE according to claim 17, wherein subsequent CORESET from the network node are adapted to be detected in a periodicity comprising a time interval, the UE further being configured to:
change the skipped part or parts of the subsequent CORESET within the time interval, so that the skipped part or parts of the CORESET in some or all of the subframes are non- overlapping or partially overlapping.

26. The UE according to claim 17, further configured to receive the CORESET in which the determined part or parts are skipped.

27. A network node configured to handle Control Resource Sets, CORESETs, in a wireless communications network, the network node further being configured to:
send a CORESET to a User Equipment, UE, which UE is adapted to operate with a reduced bandwidth,
when a bandwidth of the CORESET is larger than the bandwidth of the UE (120), receive a message from the UE which message is adapted to indicate a part or parts of the CORESET that are determined to be skipped in order to make the bandwidth of the CORESET equal or smaller than the bandwidth of the UE, such that the UE is capable of receiving the CORESET;
schedule Physical Downlink Control Channel, PDCCH, candidates in a second CORESET, based on the indicated part or parts of the CORESET that are determined to be skipped, a bandwidth of a second UE, a position of said bandwidth, and a predicted decoding performance of the PDCCH candidates at a receiver of the second UE, such that the bandwidth of the second CORESET is equal or smaller than a bandwidth of the second UE operating with a reduced bandwidth; and
send the second CORESET to the second UE as scheduled.

28. The network node according to claim 27, wherein the part or parts of the CORESET to be skipped comprise any one out of:
the first K Resource Blocks, RBs, of the CORESET;
the last K RBs of the CORESET;
the first $K_L$ RBs and the last $K_R$ RBs of the CORESET;

the first q subcarriers of the CORESET;

the last q subcarriers of the CORESET; and the first $q_L$ subcarriers and the last $q_R$ subcarriers of the CORESET.

29. The network node according to claim 28, wherein the parts of the CORESET to be skipped are adapted to comprise the first q subcarriers and the last qR subcarriers of the CORESET, wherein:

one half of the subcarriers to be skipped are comprised in the first $q_L$ subcarriers; and the other half of the subcarriers to be skipped are comprised in the last $q_R$ subcarriers of the CORESET.

30. The network node according to claim 29, wherein the parts of the CORESET to be skipped are adapted to comprise the first $K_L$ RBs and the last $K_R$ RBs of the CORESET, wherein:

one half of the RBs to be skipped are comprised in the first $K_L$ RBs; and the other half of the RBs to be skipped comprised the last $K_R$ RBs of the CORESET.

* * * * *